US011893577B2

(12) United States Patent
Suurkivi et al.

(10) Patent No.: US 11,893,577 B2
(45) Date of Patent: Feb. 6, 2024

(54) CRYPTOGRAPHIC KEY STORAGE SYSTEM AND METHOD

(71) Applicant: Coinbase, Inc., San Francisco, CA (US)

(72) Inventors: Jeremy Suurkivi, San Francisco, CA (US); Andrew Pau, San Francisco, CA (US); Jayasudha Jayakumaran, San Francisco, CA (US)

(73) Assignee: Coinbase, Inc., San Francisco, CA (US)

( * ) Notice: Subject to any disclaimer, the term of this patent is extended or adjusted under 35 U.S.C. 154(b) by 237 days.

(21) Appl. No.: 17/534,531

(22) Filed: Nov. 24, 2021

(65) Prior Publication Data

US 2022/0166605 A1    May 26, 2022

Related U.S. Application Data

(60) Provisional application No. 63/189,421, filed on May 17, 2021, provisional application No. 63/189,428, (Continued)

(51) Int. Cl.
*H04L 29/06* (2006.01)
*G06F 21/00* (2013.01)
(Continued)

(52) U.S. Cl.
CPC ......... *G06Q 20/3678* (2013.01); *H04L 9/083* (2013.01); *H04L 9/085* (2013.01);
(Continued)

(58) Field of Classification Search
None
See application file for complete search history.

(56) References Cited

U.S. PATENT DOCUMENTS 10,742,422 B1 * 8/2020 Jarjoui ................. H04L 9/3247
2009/0092252 A1 * 4/2009 Noll ....................... H04L 9/083
380/277

(Continued)

OTHER PUBLICATIONS

Feb. 4, 2022—(WO) International Search Report and Written Opinion—App PCT/US21/60759.
(Continued)

*Primary Examiner* — Lisa C Lewis
(74) *Attorney, Agent, or Firm* — Banner & Witcoff, Ltd.

(57) ABSTRACT

Aspects of the disclosure relate to storing sensitive information. A computing platform may split a signature key into shares, which may be used to regenerate the signature key. The computing platform may encrypt these shares using corresponding SEKs, and may subsequently encrypt the SEKs using corresponding operator keys. The computing platform may distribute the operator keys to user devices via corresponding HSMs. The computing platform may store the encrypted shares, encrypted SEKs, and identifiers of the user devices. The computing platform may receive requests for the encrypted SEKs from the user devices, and may send the respective encrypted SEKs accordingly. The user devices may return, to the computing platform, corresponding decrypted SEKs. The computing platform may use the SEKs to decrypt the encrypted shares, which may then be used to reconstruct the signature key.

20 Claims, 15 Drawing Sheets

Related U.S. Application Data filed on May 17, 2021, provisional application No. 63/118,191, filed on Nov. 25, 2020, provisional application No. 63/118,180, filed on Nov. 25, 2020.

(51) Int. Cl.
  *G06Q 20/36* (2012.01)
  *H04L 9/08* (2006.01)
  *H04L 9/32* (2006.01)
  *H04L 9/14* (2006.01)
  *H04L 9/00* (2022.01)

(52) U.S. Cl.
  CPC .......... *H04L 9/0861* (2013.01); *H04L 9/0891* (2013.01); *H04L 9/0894* (2013.01); *H04L 9/0897* (2013.01); *H04L 9/14* (2013.01); *H04L 9/3247* (2013.01); *H04L 9/50* (2022.05); *H04L 2209/56* (2013.01)

(56) References Cited

U.S. PATENT DOCUMENTS

| | | |
|---|---|---|
| 2013/0013931 A1* | 1/2013 | O'Hare .................. H04L 9/3231 713/189 |
| 2016/0359619 A1 | 12/2016 | Solow et al. |
| 2019/0356649 A1* | 11/2019 | Alwen .................. H04L 9/0861 |
| 2019/0356650 A1* | 11/2019 | Leavy .................... H04L 63/06 |
| 2020/0084048 A1 | 3/2020 | Lindell et al. |

OTHER PUBLICATIONS

"Manage Secrets and Protect Sensitive Data" HashiCorp Vault Project https://www.vaultproject.io/ website visited Nov. 16, 2021, pp. 1-8.

"What is a Hot Wallet" Corporate Finance Institute https://corporatefinanceinstitute.com/resources/knowledge/trading-investing/hot-wallet/ website visited Nov. 16, 2021, pp. 1-7.

* cited by examiner

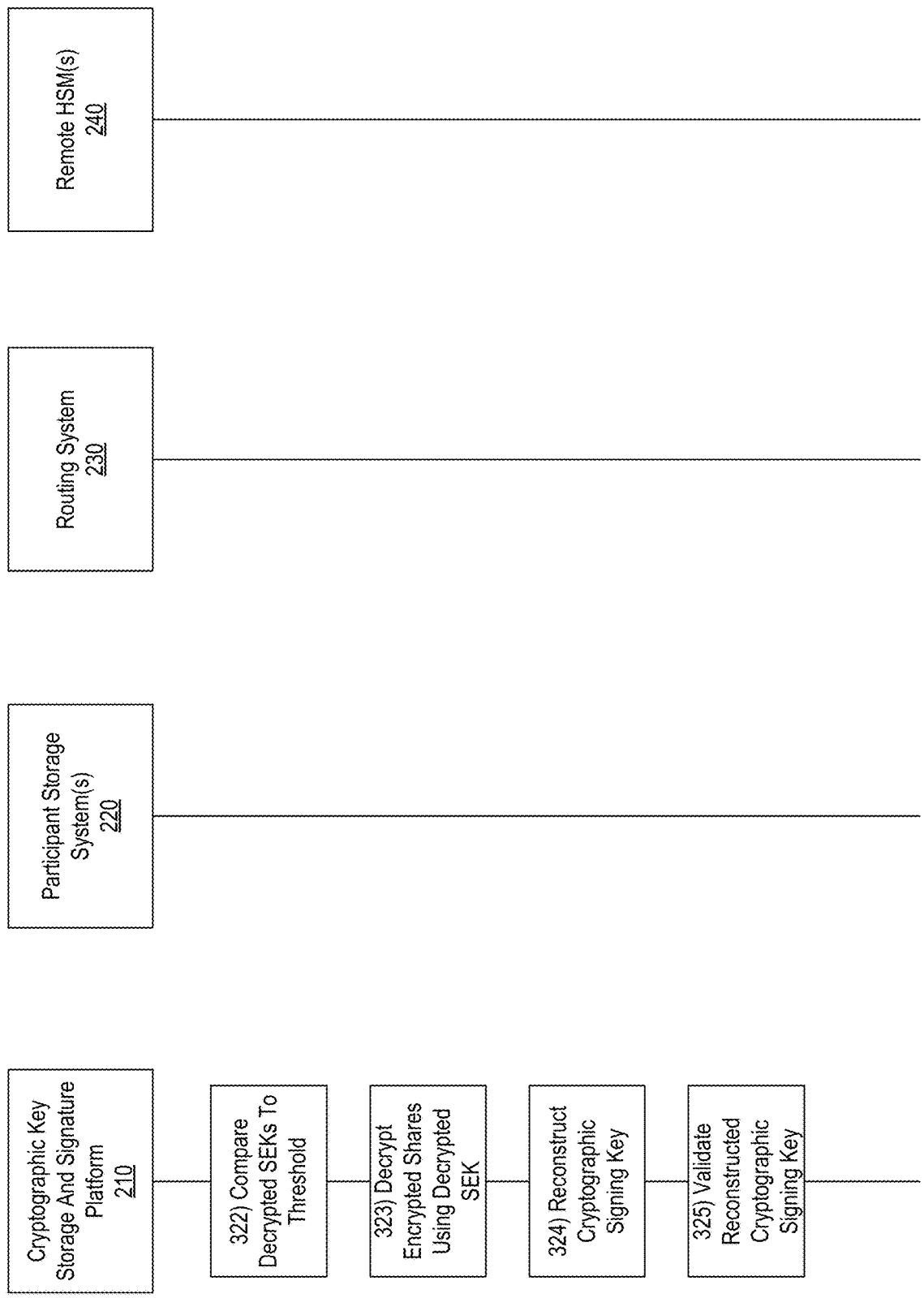

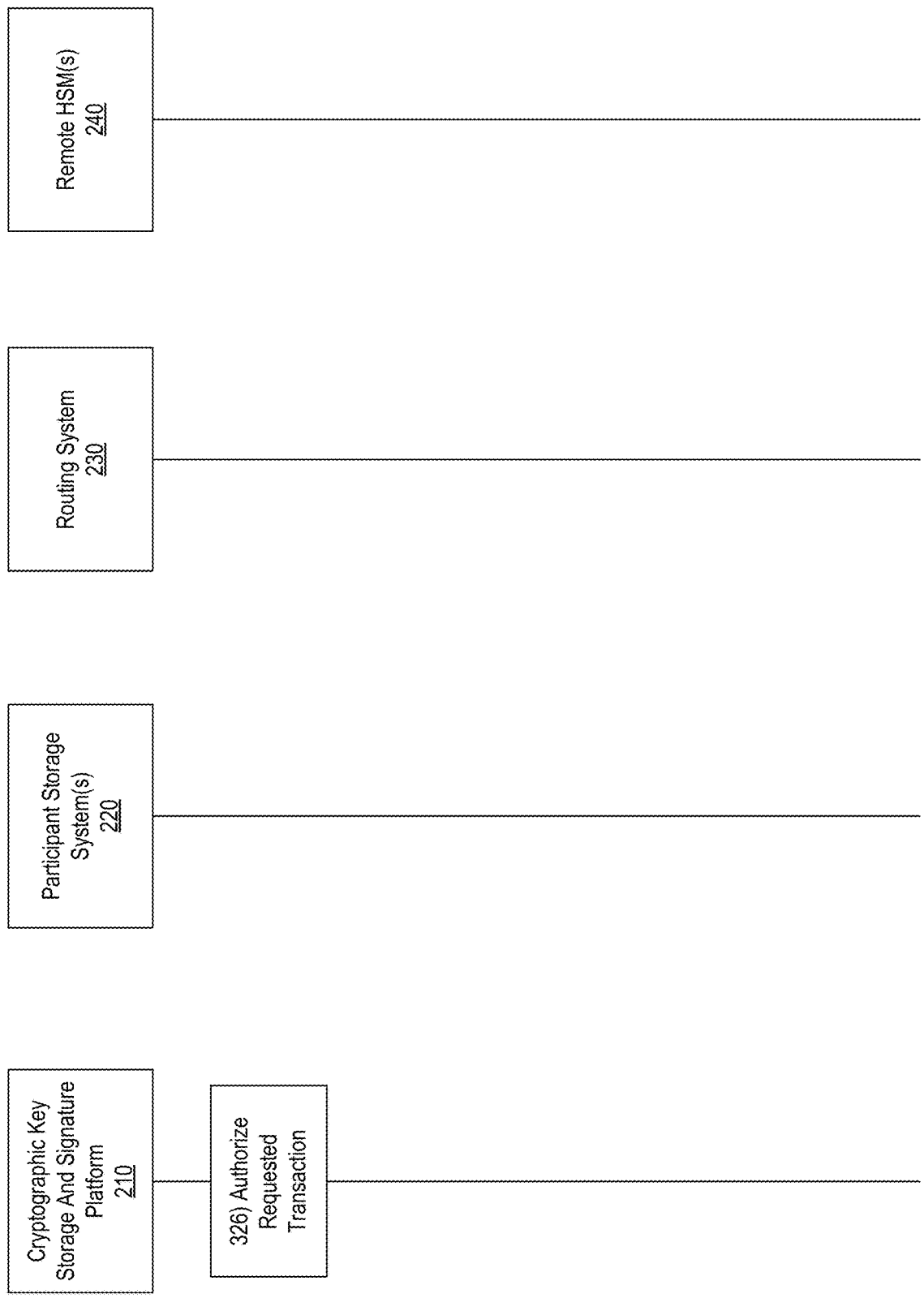

CRYPTOGRAPHIC KEY STORAGE SYSTEM AND METHOD

CROSS REFERENCE TO RELATED APPLICATIONS

This application claims priority to U.S. Provisional Application No. 63/118,180, filed Nov. 25, 2020, and entitled "CRYPTOGRAPHIC KEY STORAGE SYSTEM AND METHOD," U.S. Provisional Application No. 63/118,191, filed Nov. 25, 2020, and entitled "SYSTEM AND METHOD FOR IMPROVED KEY STORAGE AND SECURITY," U.S. Provisional Application No. 63/189,428, filed May 17, 2021, and entitled "SYSTEM AND METHOD FOR MANAGING SENSITIVE INFORMATION," and U.S. Provisional Application No. 63/189,421, filed May 17, 2021, and entitled "SYSTEM AND METHOD FOR MANAGING SENSITIVE INFORMATION," the contents of which are incorporated herein by reference in their entirety for all purposes.

FIELD

Aspects described herein generally relate to data security. More specifically, one or more aspects described herein provide security improvements in the storing of and access to sensitive data. In some instances, such improvements may provide enhanced security for cryptocurrency storage mechanisms.

BACKGROUND

In some instances, sensitive data may be sharded (e.g., split into shards, which may also be referred to as shares) or otherwise distributed to further secure the sensitive data. In some instances, such shards may encrypted to provide additional security, and the corresponding encryption/decryption keys may be distributed to a set of trusted operators/participants. In these instances, however, there may be a risk of collusion between the operators/participants, who may be able to access the sensitive data and take unauthorized actions accordingly. Similarly, there may be risks of key replication on behalf of the operators/participants, which may enable them to participate in unauthorized reconstruction of the sensitive data. In addition, there may be risks of malware, running on devices of the operators/participants, accessing or otherwise capturing the keys, which may enable further collusion and/or key replication. Accordingly, as the use of cryptographic keys and other sensitive data becomes more prevalent, it may be increasingly important to improve security corresponding to the storage of sensitive data, specifically in the context of sharded storage.

Furthermore, in some instances, hot wallets (e.g., digital wallets connected to a communications network) may be used in cryptocurrency transactions. Due to the connected nature of such wallets, they may be vulnerable to security threats such as theft or other unauthorized access. Accordingly, currency limits on such hot wallets may be low (and/or individuals may maintain low balances on their own accord) so as to minimize risk of exposure in the event of a threat. As hot wallets and cryptocurrencies become increasingly prevalent, it may be important to provide improved security mechanisms that may enable increased currency limits and/or balances while minimizing associated risks.

SUMMARY

Aspects of the disclosure provide effective, efficient, scalable, and convenient technical solutions that address and overcome the technical problems associated with storing/retrieving sensitive information, and processing hot wallet cryptocurrency transactions. In accordance with one or more embodiments of the disclosure, a computing platform comprising at least one processor, a communication interface, and memory storing computer-readable instructions may split a cryptographic signature key into a plurality of cryptographic key shares, where the cryptographic signature key may be derived using a quorum number of the plurality of cryptographic key shares. The computing platform may generate a plurality of encrypted cryptographic key shares and a plurality of share encryption keys (SEKs) by, for each respective cryptographic key share of the plurality of cryptographic key shares: 1) generating a corresponding share encryption key for the respective cryptographic key share; and 2) encrypting, using the corresponding SEK, the respective cryptographic key share to create a corresponding encrypted cryptographic key share. The computing platform may generate a plurality of encrypted SEKs and a plurality of operator keys by, for each respective SEK of the plurality of SEKs: 1) generating a corresponding operator key for the respective SEK; and 2) encrypting, using the corresponding operator key, the respective SEK to create a corresponding encrypted SEK. The computing platform may distribute the plurality of operator keys corresponding to the plurality of encrypted SEKs to a plurality of end user devices (EUDs) by, for each EUD of the plurality of EUDs, providing a corresponding operator key to a hardware security module (HSM) of the respective EUD, where the HSM may be configured to prevent unauthorized copying of the corresponding operator key. The computing platform may store the plurality of encrypted cryptographic key shares, the plurality of encrypted SEKs, and indications identifying, for each respective encrypted SEK of the plurality of encrypted SEKS, the respective EUD storing the corresponding operator key. The computing platform may receive, from a first subset of EUDs, requests to download an encrypted SEK corresponding to each respective EUD of the first subset of EUDs, where the first subset of EUDs includes at least the quorum number of EUDs. The computing platform may send, to each EUD of the first subset of EUDs, a respective encrypted SEK of the plurality of encrypted SEKs. The computing platform may receive, from each EUD of a second subset of EUDs, a corresponding decrypted SEK decrypted by a respective EUD using the operator key stored in an HSM of the respective EUD. The computing platform may decrypt, using the decrypted SEKs received from the second subset of EUDs and based on determining that the second subset of EUDs includes at least the quorum number of EUDs, corresponding encrypted cryptographic key shares. The computing platform may reconstruct, using a reconstruction algorithm and the quorum number of the plurality of decrypted cryptographic key shares, the cryptographic signature key.

In one or more instances, the computing platform may split the cryptographic signature key into the plurality of cryptographic key shares by splitting the cryptographic signature key one or more times, where each respective split of the cryptographic signature key results in a corresponding plurality of cryptographic key shares. In one or more instances, the plurality of cryptographic key shares may include a set of single use share sets.

In one or more examples, the computing platform may destroy, after reconstructing the cryptographic signature key, the plurality of cryptographic key shares and their corresponding SEKs. In one or more examples, the computing platform may receive a transaction request, where the cryptographic signature key is configured to authorize the requested transaction. The computing platform may request the plurality of SEKs, where requesting the plurality of SEKs is responsive to receiving the transaction request.

In one or more examples, the computing platform may validate the cryptographic signature key. Based on successful validation of the cryptographic signature key, the computing platform may authorize the requested transaction. In one or more examples, the computing platform may split the cryptographic signature key into the plurality of cryptographic key shares by executing one or more of: a Shamir's secret sharing algorithm, a Blakely's scheme, or a Chinese remainder algorithm.

In one or more instances, the computing platform may remove an EUD from the plurality of EUDs. The computing platform may identify whether a remaining number of EUDs in the plurality of EUDs is greater than or equal to the quorum number. Based on identifying that the remaining number of EUDs is greater than or equal to the quorum number, the computing platform may delete, for the removed EUD, a corresponding SEK and a corresponding cryptographic key share. Based on identifying that the remaining number of EUDs is less than the quorum number, the computing platform may: 1) add a new EUD to the plurality of EUDs; and 2) re-assign an operator key, previously associated with the removed EUD, to the new EUD, where re-assigning the respective operator key includes: a) transferring the respective operator key to a respective HSM for the new EUD; and b) updating an indication, for an encrypted SEK corresponding to the respective operator key and identifying the removed EUD, to identify the new EUD.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 3A-3F depict an illustrative event sequence for performing cryptographic key storage methods to enhance security in cryptocurrency storage and hot wallet transactions in accordance with one or more example embodiments;

DETAILED DESCRIPTION

Figure 1:
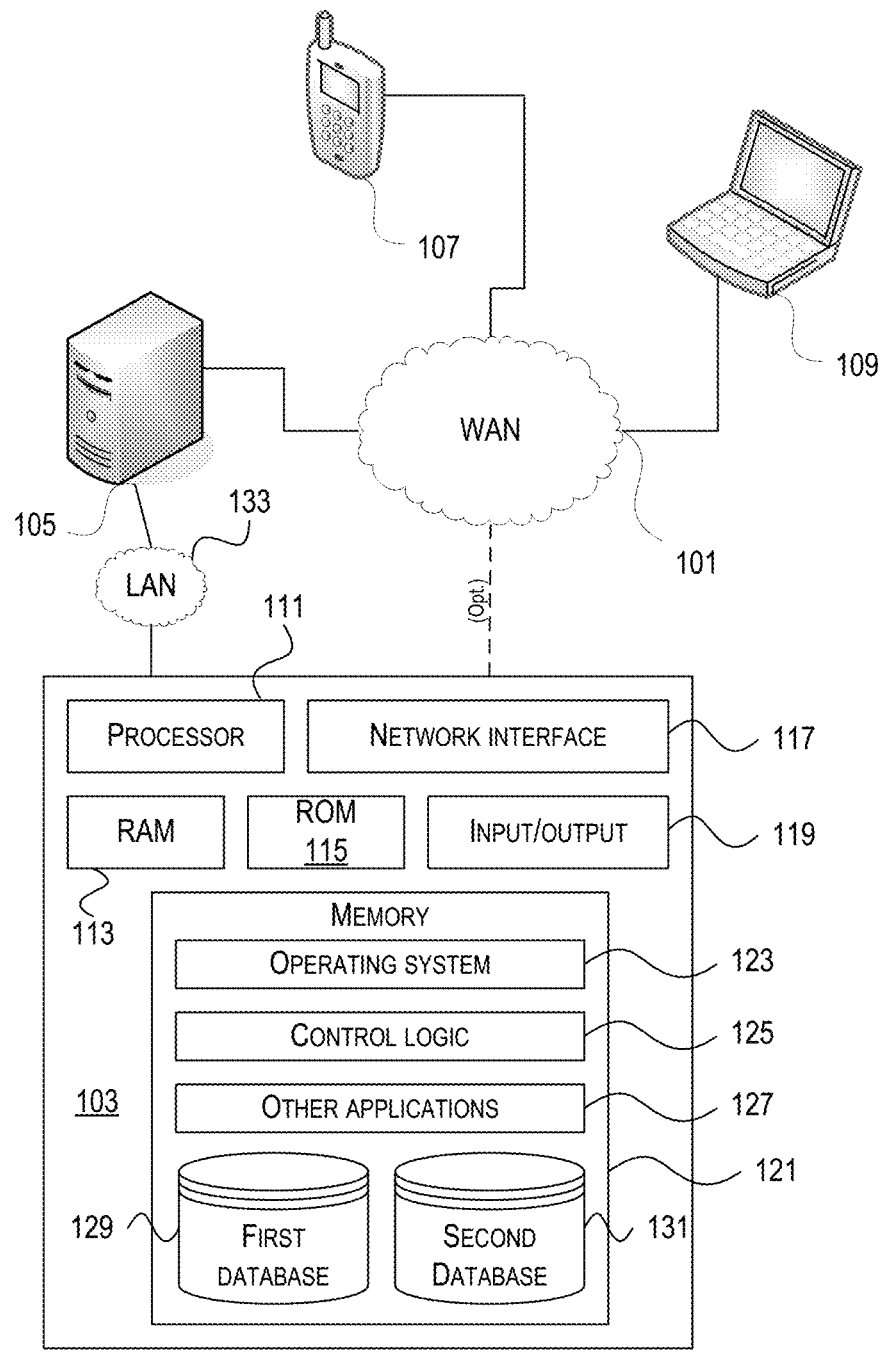
FIG. 1 depicts an illustrative computing environment that performs cryptographic key storage methods to enhance security in cryptocurrency storage and hot wallet transactions in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure relate to improved methods and systems for cryptographic key storage, and enhanced security for hot wallet transactions. For example, a storage security system may function to secure and access sensitive information. In some instances, the storage security system may include a cryptographic signer that may use sensitive information to sign cryptocurrency transactions. For example, the system may be a curve-based signer with no knowledge of cryptocurrency details (e.g., it may rely on an upstream keychain service to provide cryptocurrency functionality).

Such a storage security system may confer several benefits over conventional data security systems. First, variants of this technology may provide enhanced security. For example, the system may use a threshold access scheme (e.g., t of N access scheme, quorum access scheme, and/or other threshold access schemes) to access sensitive information. The system may decouple operators and/or other participants from the sensitive information or even shards of the sensitive information, and may instead only allow participants to hold a decryption key for an encrypted shard of the sensitive information (e.g., an encrypted shard of a secret used to derive a password to access a second decryption key for a set of encrypted sensitive information, such as encrypted cryptocurrency signing keys). In some instances, participant access to the encrypted sensitive information shards may be optionally restricted. The system may amortize risk by leveraging third party systems to store different pieces of sensitive information. The system may increase security by making participant-held sensitive information non-exportable, and/or by performing decryption and reconstruction processes (e.g., in memory). Additionally, in some instances, variants of the technology described herein may enable scalable cryptographic signers, where the cryptographic signer(s) may leverage the system and method to securely access the cryptocurrency signing keys. By increasing the security of such sensitive information, risks associated with hot wallets and their corresponding transactions may decrease, and thus transaction and/or balance limits may be increased.

These and other features are described in further detail below.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2A:
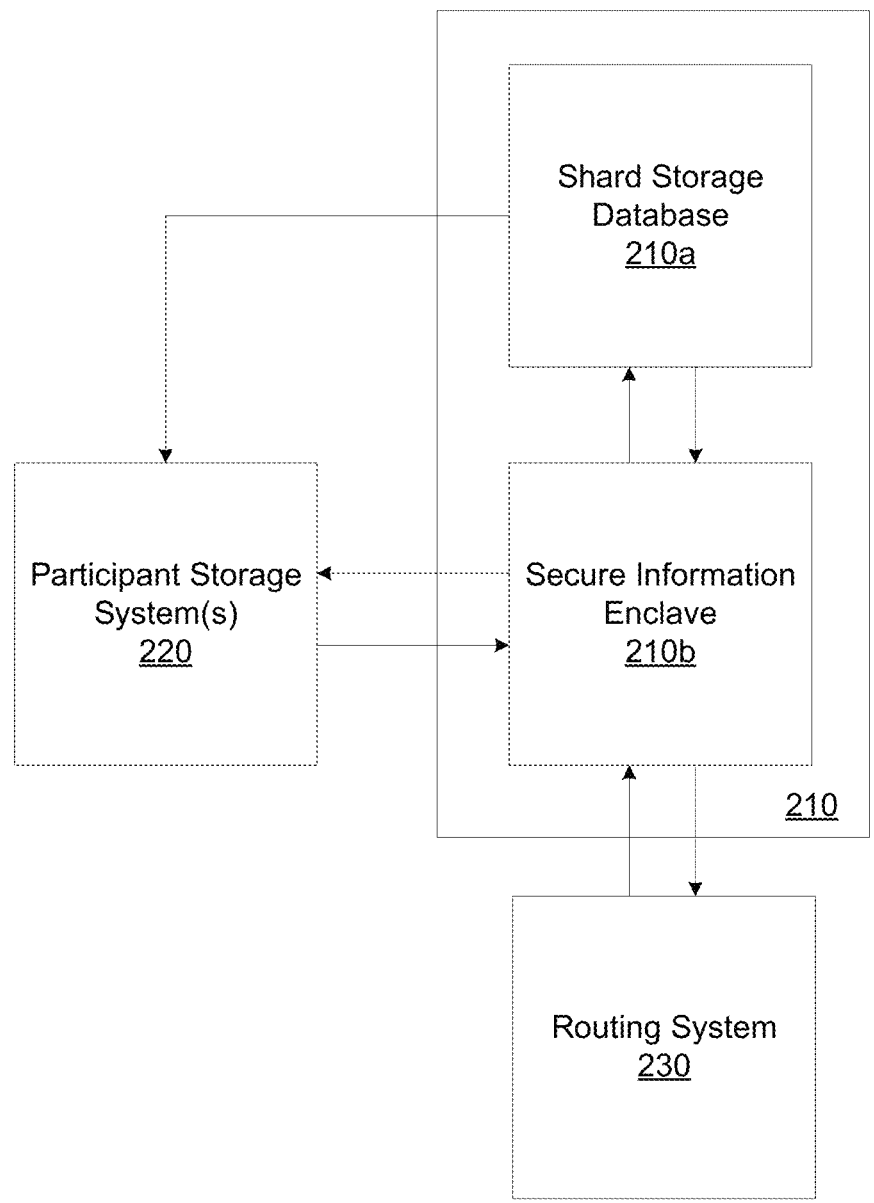
FIGS. 2A-2B depict illustrative computing environments that perform cryptographic key storage methods to enhance security in cryptocurrency storage and hot wallet transactions in accordance with one or more example embodiments.
Figure 2B:
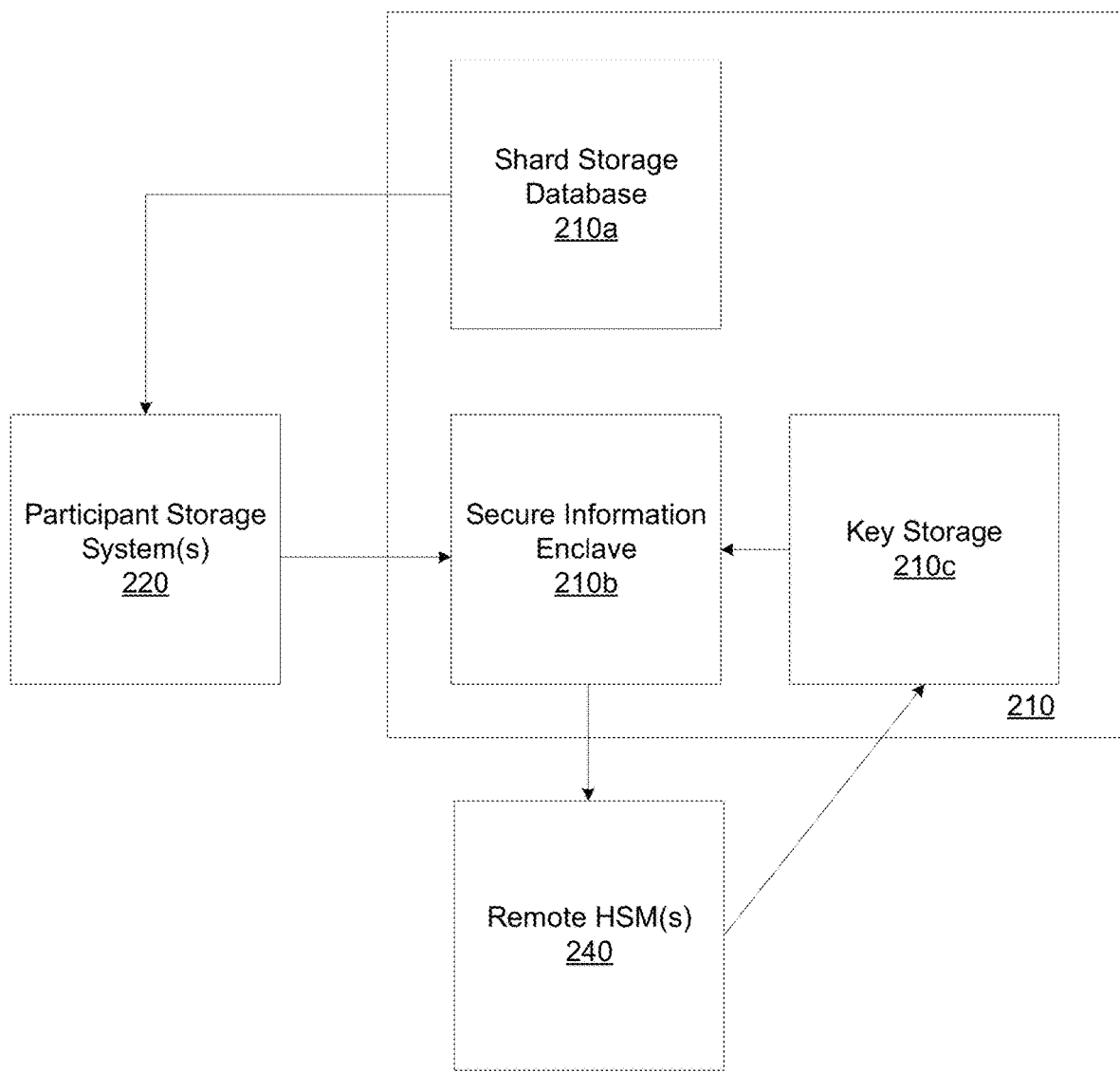

FIGS. 2A and 2B depict illustrative computing environments configured to perform cryptographic key storage for enhanced security in cryptocurrency storage and hot wallet transactions in accordance with one or more example embodiments. Referring to FIG. 2A, the computing environment may include one or more computer systems. For example, the computing environment may include the cryptographic key storage and signature platform 210, participant storage system(s) 220, and routing system 230.

As described further below, the cryptographic key storage and signature platform 210 may be a computer system that includes one or more computing devices (e.g., servers, server blades, or the like) and/or other computer components (e.g., processors, memories, communication interfaces) that may be used for cryptographic key storage, cryptocurrency transaction authorization, and/or to perform other functions as described further below. Cryptographic key storage and signature platform 210 may include a shard storage database 210*a* and a secure information enclave 210*b*. The cryptographic key storage and signature platform 210 may be configured to secure and/or otherwise access sensitive information, which may, e.g., include information to be secured, information used to access the information to be secured, and/or other information. For example, the sensitive information may include one or more of: passwords, cryptographic keys (e.g., signing keys, encryption keys, decryption keys, and/or other cryptographic keys), secrets or seeds (e.g., used to derive sensitive information such as keys or passwords), and/or other information. More specifically, such sensitive information may include one or more of: cryptocurrency signing keys (CSK), CSK decryption keys, master secrets, share encryption keys (SEK), SEK decryption keys, remote hardware security module (HSM) passwords, and/or other sensitive information. In some instances, the cryptographic key storage and signature platform 210 may be configured to include a cryptographic signer that uses the sensitive information to sign cryptocurrency transactions (which may include, for example, hot wallet cryptocurrency transactions). In some instances, the cryptographic key storage and signature platform 210 may be configured to selectively permit multi-participant, quorum-based access, and/or use of the sensitive information.

The shard storage database 210*a* may be used by the cryptographic key storage and signature platform 210 to store share sets, which may, e.g., include all or a portion of encrypted shards (e.g., shares) for a common piece of sensitive information. For example, a share set may include all encrypted shares from a common master secret. In some instances, sensitive information may be associated with one or more share sets (e.g., generated based on the sensitive information). For example, multiple share sets may preferred when a share set is single use. In some instances, in storing the share sets, the shard storage database 210*a* may optionally store encrypted versions of the SEKs used to encrypt the respective shares. In these instances, each encrypted share within the share set may be associated with a participant identifier (e.g., identifying the operator/participant holding the operator key (e.g., SEK decryption key) paired with the SEK encryption key used to encrypt the respective share), the respective SEK encryption key, and/or other information, which may be stored at the shard storage database 210*a*. In some instances, the shard storage database 210*a* may be part of the secure information enclave 210*b*, or a separate database (which may e.g., be online or offline) connected to the secure information enclave 210*b*, and/or otherwise constructed. In some instances, the cryptographic key storage and signature platform 210 may include one or more instances of the shard storage database 210*a* (e.g., for different pieces of sensitive information, different entities, and/or otherwise).

The secure information enclave 210*b* may function to generate sensitive information (e.g., perform online key or secret generation ceremonies), secure sensitive information, reconstruct sensitive information, and/or otherwise use the sensitive information. For example, the cryptographic key storage and signature platform 210 may use the secure information enclave 210*b* to perform all or parts of the methods described below. In some instances, the secure information enclave 210*b* may be used by the cryptographic key storage and signature platform 210 to optionally sign blockchain messages (e.g., transactions or other messages) using the target sensitive information.

In some instances, the cryptographic key storage and signature platform 210 may include one or more signing services configured to sign blockchain messages. In some instances, this signing service may be part of the secure information enclave 210*b* (and thus the secure information enclave 210*b* may sign the blockchain messages), or may be separate from the secure information enclave 210*b*. In some instances, the cryptographic key storage and signature platform 210 may include different signing services and/or instances thereof, which may be specific to: different blockchains, different blockchain types (e.g., unspent transaction output (UTXO) vs. account-based), different entities, different key storages (e.g., different sets of CSKs), different elliptic curves (e.g., elliptic curve digital signature algorithm (ECDSA) curves, such as secp256r1, secp256k1, and/or other elliptic curves, and/or otherwise delineated. For example, the signing service may be cryptocurrency-agnostic and/or curve agnostic, and may sign a message using a specified decrypted CSK and specified curve type (e.g., without verifying that the message's source address is associated with the CSK and/or without verifying that the curve type is compatible with the message's blockchain). In this example, the message and signing parameters (e.g., CSK identifier and/or curve type) may be passed to the signing service by the routing system 230.

In some instances, the cryptographic key storage and signature platform 210, the shard storage database 210*a*, and/or the secure information enclave 210*b* may be integrated into or otherwise form a local computing environment (e.g., an on-premises server system), a remote computing environment (e.g., a cloud computing system), a node, a set of nodes (e.g., multiple nodes), a distributed computing system, and/or any other suitable computing environment.

Participant storage system(s) 220 may be or include one or more computing devices that may be used to facilitate sensitive information access using participant sensitive information (e.g., keys, passwords, and/or other information). For example, the participant storage system(s) 220 may be configured to store participant sensitive information, which may include one or more of: share decryption keys, authentication keys for a participant interface, passwords for a remote HSM account, remote HSM quorum authentication keys, and/or other information. In some instances, each of a plurality of operators (e.g., trusted engineers, administrators, employees, or other individuals) may have a corresponding participant storage system of the participant storage system(s) 220. In some instances, the participant storage system(s) 220 may be or include one or more end user devices (e.g., mobile devices, laptop computers, desktop computers, and/or other devices), HSMs (e.g., yubiHSM™, or other HSM), mobile devices (e.g., a secret storage or computing enclave on the mobile device), and/or other storage devices/systems.

In some instances, the participant storage system(s) 220 may be configured for onboard generation of the participant sensitive information (e.g., where public keys and/or other information may be exported to the cryptographic key storage and signature platform 210 or otherwise posted). In other instances, the participant sensitive information may be generated off board the participant storage system(s) 220*b*, and may be loaded or otherwise provisioned onto the participant storage system(s) 220. In some instances, the participant storage system(s) 220 may be configured to perform secure computations, and automatically post the results to a predetermined endpoint (or otherwise use the results). In some instances, the participant storage system(s) 220 may be configured with password protection, multifactor authentication, biometric authentication, and/or be otherwise protected.

In some instances, by implementing the participant storage system(s) 220, which may be secure devices for each of the plurality of operators, share posting may be reduced to receiving a push notification, reviewing it, and accepting or rejecting it with a biometric check or otherwise. This may be beneficial, as storage on such devices may allow only a limited set of cryptographic operations.

In some instances, the participant storage system(s) 220 may be configured to generate and store a non-exportable elliptic curve private key. In these instances, the participant storage system(s) 220 may extract a public key, use the private key for signature, and perform decryption using elliptic curve integrated encryption scheme (ECIES). Additionally or alternatively, the participant storage system(s) 220 may be configured to implement, support, or otherwise perform the improved secrets posting scheme described below with regard to steps 301-309 in FIGS. 3A and 3B. Additionally or alternatively, the participant storage system(s) 220 may rely on HSMs, laptops, and/or other devices.

The routing system 230 may be or include one or more computers or computing devices (e.g., servers, server blades, or the like) configured to function as an intermediary between clients that are requesting message signing and the signing service (e.g., of the cryptographic key storage and signature platform 210). For example, the routing system 230 may be configured to route such messages from client devices or services such as hot wallets, custodial services (e.g., cold storage such as Coinbase Custody™, or the like), entities, an API endpoint, and/or other devices.

In some instances, the computing environment may be configured as illustrated in FIG. 2B. In these instances, the computing environment may include the cryptographic key storage and signature platform 210 as described above with regard to FIG. 2A. In some instances, however, the cryptographic key storage and signature platform 210 may include key storage 210c.

In these instances, the key storage 210c may be hot (e.g., keys stored in digital format, and/or connected to a communications network), cold (e.g., keys stored in nondigital format and/or otherwise disconnected from a communications network), warm (e.g., keys stored in a digital format, and/or intermittently connectable to a communications network), and/or otherwise configured. The key storage 210c may be used by the cryptographic key storage and signature platform 210 to store CSKs, which may be private keys used to sign cryptocurrency messages (e.g., transactions) for a given set of addresses (e.g., derived from the private key). In some instances, the key storage 210c may store CSKs for different blockchains (e.g., Bitcoin, Ethereum, ERC20 tokens, and/or other blockchains), different blockchain types (e.g., account based, UTXO based, or other types), and/or other blockchain subpopulations. In some instances, the key storage 210c may store CSKs belonging to other entities, where the key storage 210c maintains custody of the CSK on behalf of the entity. In some instances, the key storage 210c may be configured to store and/or transmit CSKs in an encrypted format, cleartext, or otherwise. In some instances, the key storage 210c may or might not be configured to export the CSKs. In some instances, the cryptographic key storage and signature platform 210 may include one or more key storages 210c.

In some instances, the computing environment may also include the remote HSM(s) 240 (which may, e.g., be a yubiHSM, and/or other HSM). In some instances the remote HSM(s) 240 may be cloudHSMs. The remote HSM(s) 240 may be configured to store CSK decryption keys. For example, a target CSK may be mapped to the remote HSM(s) 240, which may be mapped to one or more share sets storing encrypted SEKs and the respective encrypted shares of a master secret for generating the remote HSM password (which may, e.g., be the target sensitive information). In some instances, the remote HSM(s) 240 may be managed by a third party system, managed by the cryptographic key storage and signature platform 210, accessible by a password, and/or otherwise managed or protected.

The computing environment also may include one or more networks, which may interconnect the cryptographic key storage and signature platform 210, participant storage system(s) 220, routing system 230, and/or remote HSM(s) 240. For example, the computing environment may include a network (which may interconnect, e.g., cryptographic key storage and signature platform 210, participant storage system(s) 220, routing system 230, and/or remote HSM(s) 240).

In one or more arrangements, the cryptographic key storage and signature platform 210, participant storage system(s) 220, routing system 230, and/or remote HSM(s) 240 may be any type of computing device capable of sending and/or receiving requests and processing the requests accordingly. For example, the cryptographic key storage and signature platform 210, participant storage system(s) 220, routing system 230, remote HSM(s) 240 and/or the other systems included in computing environment may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of the cryptographic key storage and signature platform 210, participant storage system(s) 220, routing system 230, and/or remote HSM(s) 240 may, in some instances, be special-purpose computing devices configured to perform specific functions.

In some instances, communication between the cryptographic key storage and signature platform 210, participant storage system(s) 220, the routing system 230, remote HSM(s) 240, and/or other devices/components may be secured or otherwise controlled using access credentials (e.g., passwords, application programming interface (API) tokens, and/or other access credentials), whitelists, bastion servers, transport layer security (TLS) servers, and/or other control mechanisms.

Although FIGS. 2A and 2B depict different computing environments, this is for illustrative purposes only, and the systems and features of each environment may be applied across either of illustrative computing environments without departing from the scope of the disclosure.

FIGS. 3A-3F depict an illustrative event sequence for cryptographic key storage for enhanced security in cryptocurrency storage and transactions in accordance with one or more example embodiments. It should be understood that these figures may depict a group of steps that may be performed in the order as shown in FIGS. 3A-3F (e.g., step 305 shown in FIG. 3B may occur in sequence after step 304 shown in FIG. 3A). This sequence is merely illustrative however, and these steps may be performed in other orders/combinations without departing from the scope of the disclosure.

In some instances, the cryptographic key storage and signature platform 210 may secure a cryptographic signature key (CSK) (which may e.g., subsequently be used to secure other target sensitive information, change access to target sensitive information that may be difficult to change, and/or otherwise be used). In some instances, rotation of such CSKs may be difficult, since rotation may prompt for on-chain transfer of large amounts of crypto assets. In these instances, rather than rotating the CSKs themselves, the cryptographic key storage and signature platform 210 may rotate CSK decryption keys used to decrypt the encrypted CSKs. Additionally or alternatively, if the CSK decryption key is difficult to rotate (e.g., due to decryption and/or re-encryption of multiple CSKs), the cryptographic key storage and signature platform 210 may rotate a master secret used to access the CSK decryption key. These and other features are described further below with regard to FIGS. 3A-3F.

Figure 3A:
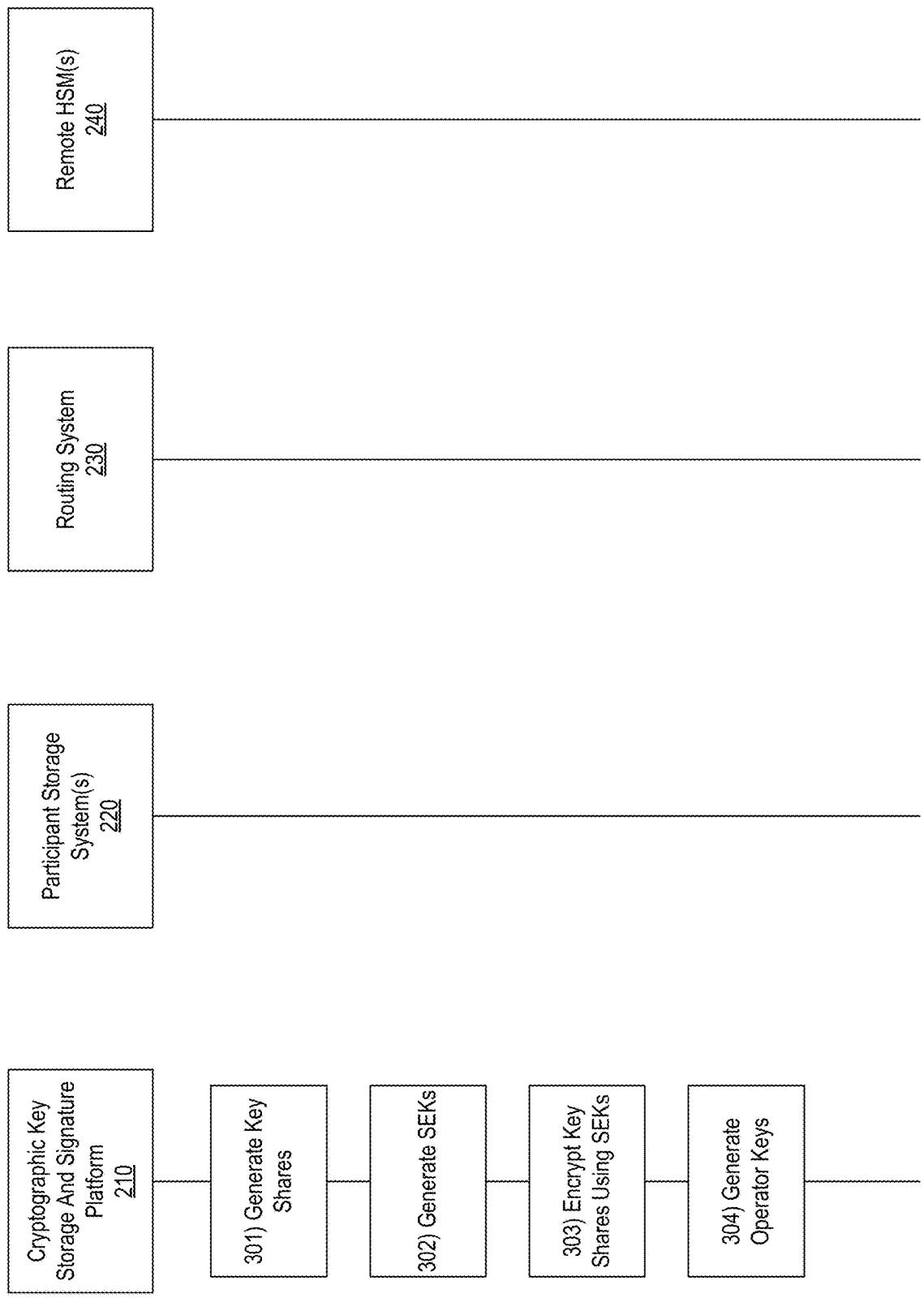

Referring to FIG. 3A, at step 301, a cryptographic key storage and signature platform 210 (which may be, for example, the data server 103 as illustrated in FIG. 1) may split sensitive information (such as a CSK) into a plurality of shares. For example, the cryptographic key storage and signature platform 210 may determine a cleartext version of the CSK/sensitive information. In some instances, the cryptographic key storage and signature platform 210 may retrieve the sensitive information from a sensitive information source. Additionally or alternatively, the cryptographic key storage and signature platform 210 may generate the sensitive information (e.g., randomly generated, generated using a formula, generated using a cryptographic process, and/or otherwise generated). Additionally or alternatively, the cryptographic key storage and signature platform 210 may re-generate the sensitive information (e.g., using the retrieval/regeneration process described below with regard to steps 311-324. In some instances, in retrieving the sensitive information, the cryptographic key storage and signature platform 210 may retrieve one or more of: a master secret, a CSK decryption key, a password, a CSK, and/or any other sensitive information.

In some instances, the cryptographic key storage and signature platform 210 may generate the sensitive information based on or in response to the creation of an online cryptocurrency wallet (e.g., the first account, the second account, or other accounts). For example, the cryptographic key storage and signature platform 210 may receive a request to open a first account (which may, e.g., be a cryptocurrency hot wallet), and may open or otherwise establish the first account accordingly. In order to secure the first account, the cryptographic key storage and signature platform 210 may generate sensitive information, such as a CSK, so as to configure the cryptographic key storage and signature platform 210 to authorize transactions for the first account.

Once this sensitive information is retrieved, the cryptographic key storage and signature platform 210 may store the cryptographic signing key for use in authorizing future transactions using the methods described herein. For example, the cryptographic key storage and signature platform 210 may shard the sensitive information. For example, the cryptographic key storage and signature platform 210 may split the sensitive information into smaller parts (e.g., for the purposes of distributing the ability to reconstruct sensitive information across different operators/participants, devices, and/or otherwise). In some instances, the cryptographic key storage and signature platform 210 may split the sensitive information using Shamir's secret sharing, Blakely's scheme, the Chinese remainder theorem, and/or other secret sharing schemes. In some instances, the cryptographic key storage and signature platform 210 may split the sensitive information using t of n sharding, in which at least t shards of the original n shards may be needed to reconstruct the sensitive information. In these instances, the variables t and n may be predetermined, dynamically determined, determined based on a number of participants within a participant set (e.g., where n is a multiple of the number of participants within the participant set), and/or otherwise determined.

At step 302, the cryptographic key storage and signature platform 210 may generate, retrieve, or otherwise obtain a plurality of share encryption keys (SEK). For example, the cryptographic key storage and signature platform 210 may obtain a unique SEK for each share of the sensitive information (generated at step 301). In some instances, the cryptographic key storage and signature platform 210 may generate the SEKs randomly, deterministically, based on a corresponding share of the sensitive information, and/or otherwise. In some instances, in generating the SEKs, the cryptographic key storage and signature platform 210 may generate a plurality of SEKs, where each SEK is specific to both the corresponding share of the sensitive information and a share set (comprising encrypted shares of sensitive information and their corresponding encrypted SEKs). Alternatively, the cryptographic key storage and signature platform 210 may generate a single shared SEK for all of the shares of sensitive information and/or shared SEK across share sets. In some instances, the cryptographic key storage and signature platform 210 may generate the SEKs before splitting of the sensitive information, after splitting of the sensitive information, and/or at any other time. In some instances, the SEKs used to encrypt shares of the sensitive information within a particular share set may be referred to herein as an SEK set.

In some instances, each SEK may be configured to encrypt one or more shares of sensitive information. For example, the SEKs may be configured to encrypt a master secret share. In some instances, the SEKs may be symmetric, asymmetric (e.g., where the sensitive information share may be encrypted with the public half of the asymmetric pair), and/or other keys. In some instances, the cryptographic key storage and signature platform 210 may generate the SEKs randomly, deterministically, or otherwise.

Figure 7:
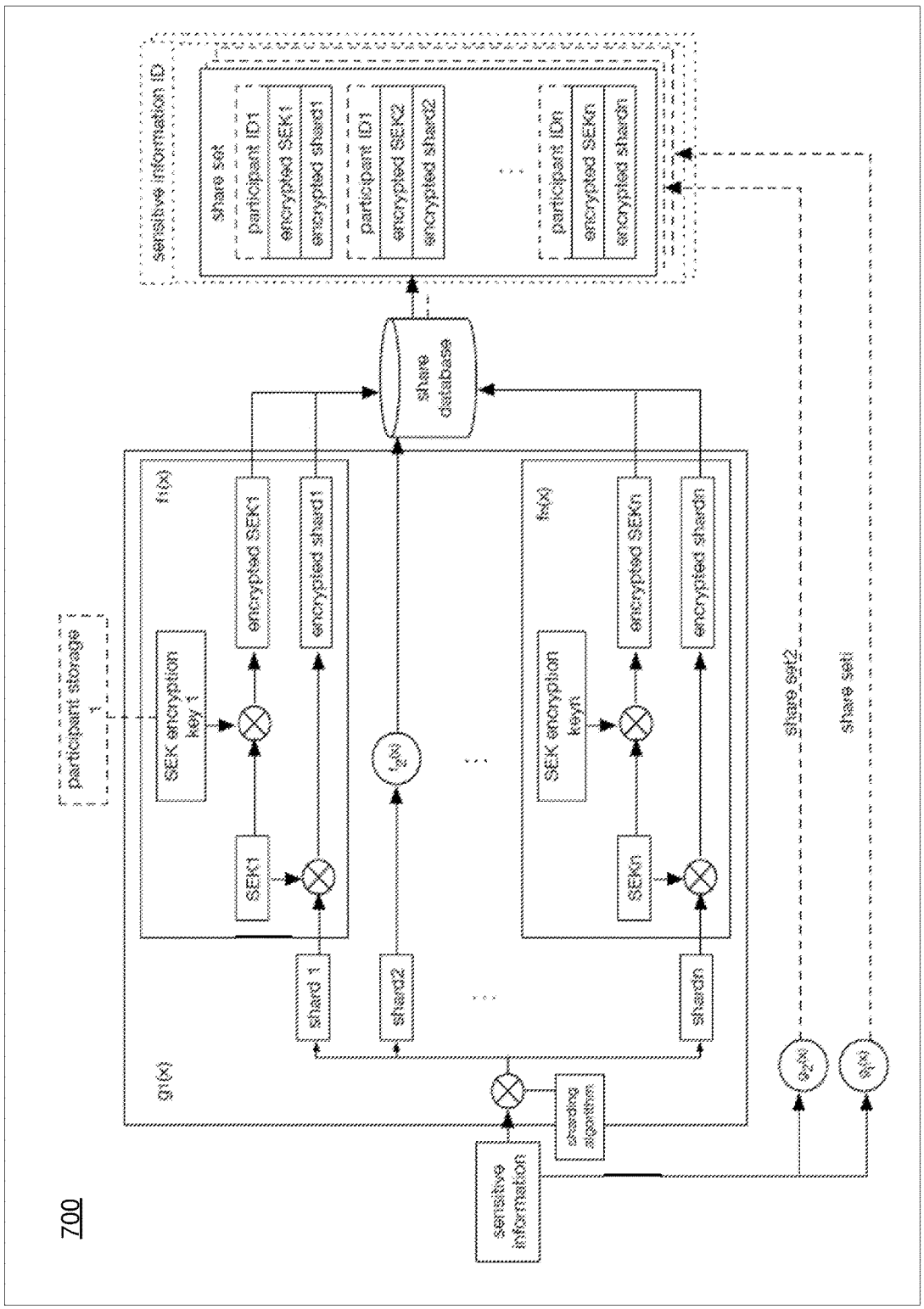
FIGS. 7-9 depict illustrative diagrams depicting cryptographic key storage methods to enhance security in cryptocurrency storage and hot wallet transactions in accordance with one or more example embodiments.

At step 303, once the SEKs have been generated or otherwise obtained, the cryptographic key storage and signature platform 210 may encrypt each share of the sensitive information with its respective SEK. In doing so, the cryptographic key storage and signature platform 210 may secure each share, such that the respective share is not stored in cleartext. This is illustrated, for example, in the diagram 700, which is depicted in FIG. 7. In some instances, such encrypted shares of the sensitive information may be referred to herein as a share set. In some instances, the cryptographic key storage and signature platform 210 may encrypt each share within a share set with a different SEK. In other instances, the cryptographic key storage and signature platform 210 may encrypt each share with a shared SEK. In some instances, the cryptographic key storage and signature platform 210 may encrypt each share with an SEK that is specific to the share set. In other instances, the cryptographic key storage and signature platform 210 may encrypt each share with an SEK that is shared across share sets. In some instances, the cryptographic key storage and signature platform 210 may encrypt each share of the sensitive information using advanced encryption standard Galois/Counter mode (AES-GCM) encryption.

At step 304, the cryptographic key storage and signature platform 210 may generate or otherwise obtain operator keys (SEK encryption keys), specific to each of the participant storage system(s) 220. In some instances, the cryptographic key storage and signature platform 102 may generate the operator keys randomly, deterministically, based on a corresponding SEK, and/or otherwise. In some instances, in generating the operator keys, the cryptographic key storage and signature platform 210 may generate one or more of: share decryption keys, authentication keys for a participant interface, passwords for a remote HSM account, remote HSM quorum authentication keys, and/or other keys/information. In some instances, the cryptographic key storage and signature platform 210 may associate each operator key (and optionally the SEK ciphered using the operator key) with a participant (or participant storage). In these instances, the corresponding participant storage system(s) 220 may store the respective operator keys paired with a corresponding SEK decryption key. In some instances, the cryptographic key storage and signature platform 210 may associate each operator key with an entity or other variable.

Additionally or alternatively, in generating the operator keys, the cryptographic key storage and signature platform 210 may generate CSK decryption keys configured to decrypt encrypted CSKs. In these instances, each CSK may be encrypted by one or more operator keys. In some instances, the cryptographic key storage and signature platform 210 may reconstruct the operator key using shares (e.g., decrypted using SEKs posted by other participants/operators), and/or otherwise generated. In some instances, the operator keys may be exportable or unexportable. In some instances, the operator key may itself be encrypted (e.g., using a password, using another encryption key, and/or otherwise). In some instances, the operator key may be a symmetric key, asymmetric key, or other key. In some instances, the CSK decryption key may be periodically rotated, or, in other instances, may be static.

Figure 3B:
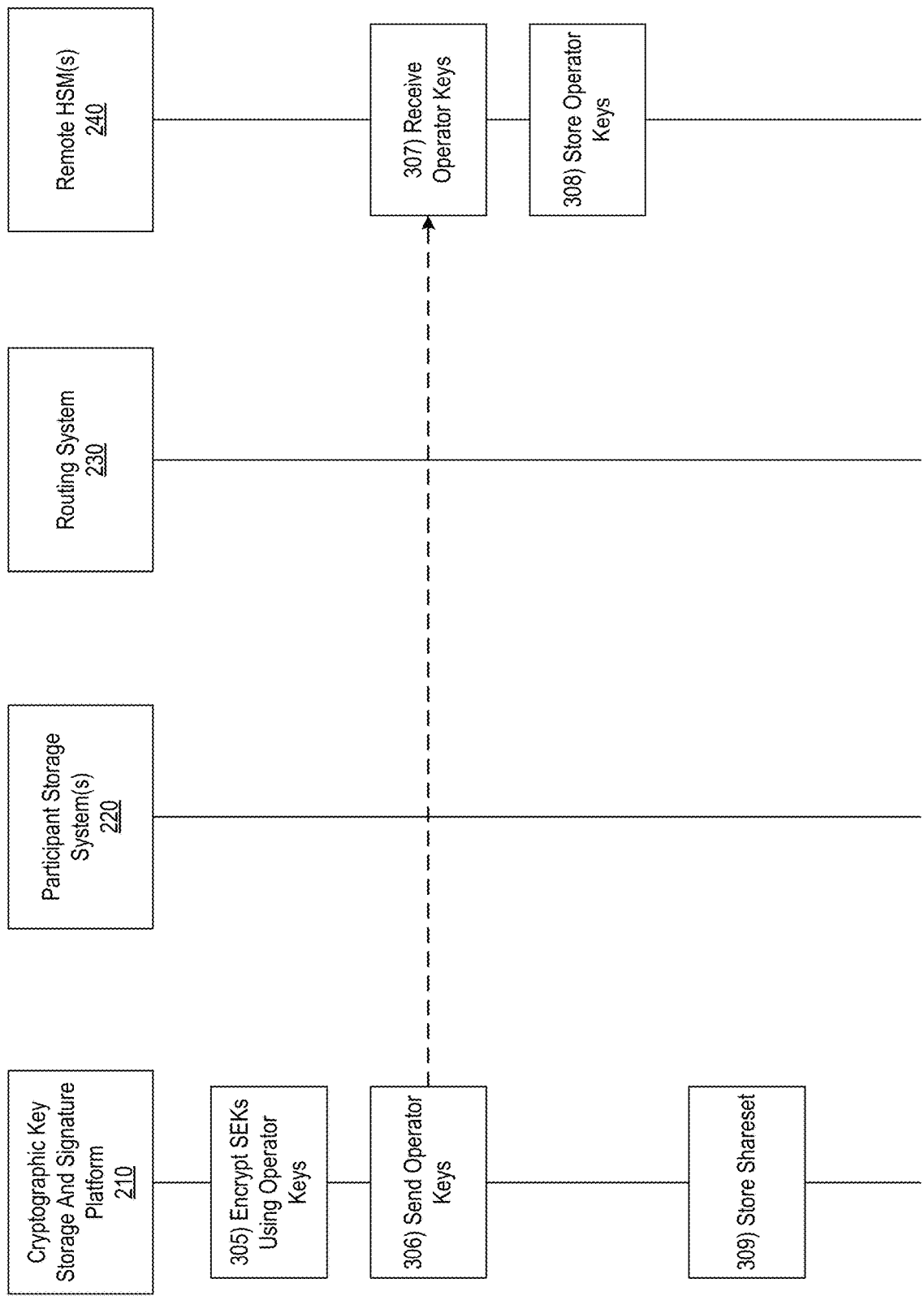

Referring to FIG. 3B, at step 305, the cryptographic key storage and signature platform 210 may encrypt each respective SEK using a corresponding operator key. In doing so, the cryptographic key storage and signature platform 210 may secure the SEKs so they are not stored in cleartext. In some instances, the cryptographic key storage and signature platform 210 may encrypt each SEK within an SEK set with a different operator key. In other instances, the cryptographic key storage and signature platform 210 may encrypt each SEK within an SEK set with a shared operator key. In some instances, the operator keys may be reused across SEK sets, or may be specific to an SEK set. For example, one or more SEK sets may be generated for a given piece of sensitive information. In some instances, the cryptographic key storage and signature platform 210 may use operator keys associated with a common set of participants (e.g., associated with the same entity) to encrypt SEKs within an SEK set. In other instances, the cryptographic key storage and signature platform 210 may use operator keys associated with different participant sets to encrypt SEKs within an SEK set. In some instances, the cryptographic key storage and signature platform 210 may encrypt the SEKs with operator keys associated with an entity that legally owns the CSKs that the sensitive information provides access to, a trusted participant set (e.g., operators of the participant storage system(s) 220, or other participant set). In some instances, the cryptographic key storage and signature platform 210 may encrypt the SEKs using an elliptic curve integrated encryption scheme (ECIES) with, for example, the operator keys (which may, in some instances, include public keys for the corresponding operators).

At step 306, the cryptographic key storage and signature platform 210 may send, share, or otherwise provide the operator keys, generated at step 304 and used to encrypt the SEKs at step 305, to respective remote HSM(s) 240. For example, the cryptographic key storage and signature platform 210 may send the operator keys to the remote HSM(s) 240 via a communication interface and while a wired or wireless data connection is established between the cryptographic key storage and signature platform 210 and the remote HSM(s) 240. In some instances, in sending the operator keys, the cryptographic key storage and signature platform 210 may cause the operator keys to be encrypted at the remote HSM(s) 240.

At step 307, the remote HSM(s) may receive the respective operator keys sent at step 306. For example, the remote HSM(s) 240 may receive the respective operator keys while a wired or wireless data connection is established between the remote HSM(s) 240 and the cryptographic key storage and signature platform 210.

At step 308, the respective remote HSM(s) 240 may store their corresponding operator keys (e.g., the operator keys received at step 307). In some instances, the remote HSM(s) 240 may store asymmetric keys configured to decrypt the encrypted SEKs (which may, in some instances, be single use keys). Additionally or alternatively, the remote HSM(s) 240 may store asymmetric keys (which may, e.g., authenticate mutual transport layer security (mTLS) to a system administrator API). Additionally or alternatively, the remote HSM(s) 240 may store passwords for corresponding remote HSM crypto officer accounts (which may, e.g., be an account for a corresponding operator/participant). Additionally or alternatively, the remote HSM(s) 240 may store asymmetric keys for participating in remote HSM quorum authentication.

Storing such information/secrets on the remote HSM(s) 240 may ensure, with a high degree of certainty, that none of the information/secrets/keys have been copied in the event of ownership transfer or otherwise copied in an unauthorized manner. Similarly, information stored at the remote HSM(s) 240 may be isolated from malware or other viruses that may infect participant storage system(s) 220.

At step 309, the cryptographic key storage and signature platform 210 may store the share set (e.g., the encrypted shares and their respective encrypted SEKs) in a database (e.g., shard storage database 210a, or otherwise). In other instances, the cryptographic key storage and signature platform 210 may store the encrypted shares and their respective encrypted SEKs independently. In some instances, the cryptographic key storage and signature platform 210 may store the share set in the shard storage database 210a.

In some instances, in storing the share set, the cryptographic key storage and signature platform 210 may store the encrypted SEKs along with a participant identifier (e.g., identifying a corresponding operator/participant account), independently store the encrypted SEKs, and/or otherwise store the encrypted SEKs. In some instances, the cryptographic key storage and signature platform 210 may store an association between the encrypted shares and their respective encrypted SEKs. An example of such storage is illustrated in FIG. 7, which depicts an example share set in storage. In some instances, the cryptographic key storage and signature platform 210 may store each encrypted SEK in association with the sensitive information share that the respective SEK was used to encrypt, a participant identifier (e.g., associated with the corresponding operator key), the corresponding operator key, and/or other information. Alternatively, the cryptographic key storage and signature platform 210 may store each SEK in cleartext, discarded, or otherwise stored. In some instances, the cryptographic key storage and signature platform 210 may store the encrypted SEKs using the secure information enclave 210b, a remote system, a participant storage system(s) 220 (e.g., a participant/operator associated with the corresponding operator key). In some instances, the cryptographic key storage and signature platform 210 may group, for storage, one or more encrypted SEKs into an SEK set, which may include all SEKs used to encrypt the shares of a common piece of sensitive information. In these instances, the encrypted SEKs may be globally unique, locally unique within the SEK sets, and/or otherwise unique.

In some instances, steps 301-309 may be repeated any number of times to generate multiple share sets. For example, the $g_i(x)$ function illustrated in FIG. 7 may represent any number of repeated iterations of the above described steps. In some instances, steps 301-309 may be repeated to generate multiple pieces of sensitive information. Additionally or alternatively, steps 301-309 may be repeated for a single piece of sensitive information to generate multiple share sets. This may be useful, for example, when each share set is to be configured for single use (e.g., burned or otherwise destroyed after reconstruction of the sensitive information). In some instances, this storage process may be repeated from step 302, where the same shares are re-encrypted using a different set of SEKs. Alternatively, the process may be repeated from step 301, where the sensitive information is resharded and then encrypted using the same or different SEKs. As yet another variation, the process may be repeated from step 305, where different operator keys may be selected for and used to encrypt each SEK. In this example, the set of operator keys may, in some instances, be the same as in a prior iteration (e.g., different operator key to SEK mapping may be used for the same operator key set), or may be different (e.g., different operator keys, or even operators themselves, may be used). In some instances, the cryptographic key storage and signature platform 210 may monitor a count of unused shares, and may produce new share sets if the count drops below a threshold value. In instances where (e.g., due to multiple failed deployments or otherwise), all unused share sets have been exhausted, the cryptographic key storage and signature platform 210 may reuse a share set or otherwise recover the sensitive information from a disaster recovery system.

The disaster recovery system may provide three primary services: recovery of keys, recovery of remote HSM(s) 240 data, and recovery of remote HSM(s) 240 passwords. For example, keys may be persisted in multi-region cloud storage (e.g., multi-region buckets) before being assigned. With regard to data recovery, master secrets and/or other sensitive information may be sent to cloud storage backups of a remote HSM state, which may, e.g., be password protected. For passwords, quorum authentication may be leveraged to provide a quorum of operators with the ability to change remote HSM 240 passwords.

Each operator may be assigned a remote HSM crypto offer account (e.g., an operator account), and the password to these accounts may be stored at HSM system(s) 240 as opaque data. Asymmetric keys may be automatically created, registered, and stored for quorum authentication. This key may be registered with remote HSM(s) 240 instances automatically, and may be stored on the operator's corresponding HSM system(s) 240.

In some instances, this password change operation may proceed as described below. An operator may call a password change endpoint in a system administrator API, which may generate a quorum authentication token from remote HSM(s) 240. A quorum of the system operators may now download this token, sign it with the quorum authentication asymmetric keys (stored in the HSM system(s) 240), and upload signatures via the administrator API. Once a quorum of signatures is obtained, the original operator may be able to perform the password change operation. In some instances, the quorum token may be valid for only a single operation (and thus the above procedure must be repeated to make multiple changes).

In some instances, this password change operation may be used to reset any remote HSM(s) 240 passwords. It may also, in some instances, be used to reset a forgotten password for a crypto user account that holds a key encrypting cryptocurrency private keys.

Additionally or alternatively, for disaster recovery, a number of operators may simply be increased. Additionally or alternatively, an account may be enabled for recovery. In this example, a host may have access to the remote HSM(s) 240, and a password may be recovered through operator support or other recoverability architectures. Additionally or alternatively, a first HSM of the remote HSM(s) 240 may be used to store decryption keys for a primary password and a second HSM of the remote HSM(s) may be used to store operator/account passwords (and any corresponding public keys). Additionally or alternatively, a secondary account may be created. In this example, a primary encryption key may be shared with the secondary account, and a new corresponding password may be created and shared to a separate set of HSMs. Additionally or alternatively, additional backups of operator passwords may be created. For example, in addition to storing passwords on the HSM system(s) 240, copies of the passwords may be stored in password managers or otherwise. Additionally or alternatively, backup copies of cryptocurrency private keys may be encrypted using cold keys for encryption.

In some instances, the operators involved in the storage method may be changed through various iterations of the above described storage method. For example, operators may be added, removed, exchanged, and/or otherwise adjusted within a participant set (which may e.g., be associated with the set of operator keys). In some instances, a participant storage system 220 for the respective operator may be destroyed, but the share set might not be adjusted (e.g., as long as a remaining number of operators/participants within an operator/participant set is equal to or higher than a value t). For example, the cryptographic key storage and signature platform 210 may identify whether a remaining number of operators/participants is greater than or equal to the quorum value. If the cryptographic key storage and signature platform 210 identifies that the number of remaining operators/participants is less than the quorum number, a new operator (and corresponding participant storage system 220) may be added, and the operator key for the removed operator may be re-assigned to the new operator. If instead the cryptographic key storage and signature platform 210 identifies that the remaining operators/participants do meet or exceed the quorum number, the operator key for the removed operator may be re-assigned to another operator. Alternatively, an encrypted SEK and corresponding encrypted share associated with the respective operator may be removed from the share set. In other instances, the operator/participant set may be updated, and new share sets may be generated using the operator keys for the updated operator set. As yet another example, a participant storage system 220 (e.g., which may be holding an operator key for a preexisting share set) for the respective operator may be reassigned to a new operator (e.g., if a number of encrypted shares in the share set exceeded the prior number of operators in the operator/participant set). Once an operator key is reassigned or otherwise associated with a new operator/participant, an identifier for a corresponding encrypted SEK may be updated to reflect the association between the encrypted SEK and the new operator/participant.

In some instances, the storage of CSKs, as described above with regard to steps 301-309, may be performed and/or orchestrated by the secure information enclave 210b, a signing service, a remote system, a local system (e.g., a participant device, participant storage system(s) 220, and/or other devices), and/or other devices/systems/components. In some instances, the storage of CSKs as described above with regard to steps 301-309 may be performed periodically, when a number of share sets for the CSK/sensitive information drops below a threshold number, and/or at any other suitable time.

Accordingly, by storing sensitive information, secrets, and/or other information according to the methods described above, a number of technical benefits may be achieved such as: reduced operational burden for operators, improved security of stored secret shares, reduced replay value of captured data, easy rotation of operators, and/or other benefits.

Figure 3C:
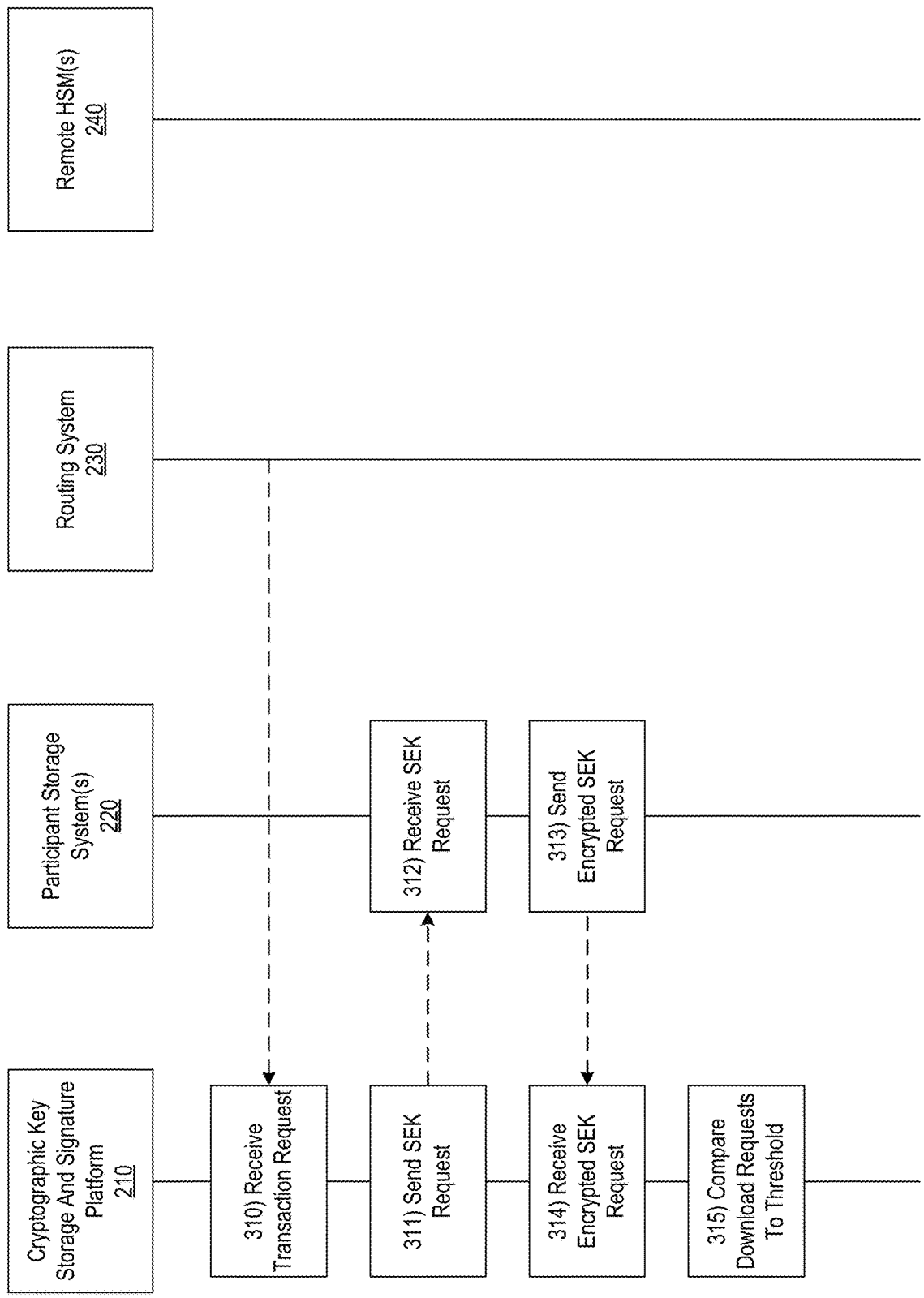

Referring to FIG. 3C, at step 310, the cryptographic key storage and signature platform 210 may receive a transaction request. For example, the cryptographic key storage and signature platform 210 may receive a request to authorize a transfer of an amount of cryptocurrency from the first user account to a second user account. In some instances, the first user account and/or the second user account may be hot (e.g., connected to a communications network), cold (e.g., disconnected from a communications network), warm (e.g., intermittently connectable to a communications network), and/or otherwise configured. In some instances, the cryptographic key storage and signature platform 210 may receive the transaction request from the routing system 230 (which may, e.g., have received the transaction from a user or client device such as client computers 107 or 109).

To authorize the requested transaction, the cryptographic key storage and signature platform 210 may recover the sensitive information (e.g., the CSK stored above at steps 301-309). Accordingly, the cryptographic key storage and signature platform 210 may initiate the information recovery process described below by steps 310-324. In some instances, the cryptographic key storage and signature platform 210 may initiate this recovery process each time target sensitive information needs to be used (e.g., each time a transaction is to be signed, each time a connection to the remote HSM 240 needs to be made, in response to a client access request, and/or otherwise), when an access request is received (e.g., from an operator, from an administrator, a quorum agreement to access the sensitive information, and/or otherwise), when a secure information enclave 210b is initialized, and/or upon occurrence of any other access event.

At step 311, the cryptographic key storage and signature platform 210 may send a request to the participant storage system(s) 220 to provide decrypted SEKs that may be used to decrypt the encrypted shares. In some instances, the cryptographic key storage and signature platform 210 may send the request to participant storage system(s) 220 corresponding to each respective member of an operator/participant set (e.g., each participant storage system 220 at which an operator key, used to encrypt an SEK, is stored). In some instances, the cryptographic key storage and signature platform 210 may identify the participant storage system(s) 220 using an operator or participant identifier stored along with each respective encrypted SEK. In some instances, the cryptographic key storage and signature platform 210 may send the SEK request via a communication interface and while a wired or wireless connection is established with the participant storage system(s) 220.

At step 312, the participant storage system(s) 220 may receive the respective SEK requests sent at step 311. For example, the participant storage system(s) 220 may receive the respective SEK requests while a wired or wireless connection is established between the respective participant storage system(s) 220 and the cryptographic key storage and signature platform 210.

At step 313, a first subset of the participant storage system(s) 220 (e.g., end user devices) may send respective requests to download an encrypted SEK corresponding to their respective operator/participant identifiers (e.g., an encrypted SEK that may be decrypted using its corresponding operator key). In some instances, the first subset of the participant storage system(s) 220 may send the encrypted SEK download requests while a wired or wireless data connection is established with the cryptographic key storage and signature platform 210.

At step 314, the cryptographic key storage and signature platform 210 may receive the encrypted SEK download requests from the first subset of the participant storage system(s) 220. For example, the cryptographic key storage and signature platform 210 may receive the encrypted SEK download requests via a communication interface and while a wired or wireless connection is established with the participant storage system(s) 220.

At step 315, the cryptographic key storage and signature platform 210 may compare a number of encrypted SEK download requests (e.g., a number of participant storage system(s) comprising the first subset) to a quorum threshold. For example, the cryptographic key storage and signature platform 210 may identify whether the number of encrypted SEK download requests meets or exceeds the quorum threshold, or rather whether the number of encrypted SEK download requests is less than the quorum threshold. If the cryptographic key storage and signature platform 210 identifies that the number of encrypted SEK download requests meets or exceeds the quorum threshold, the cryptographic key storage and signature platform 210 may proceed to step 316. Otherwise, if the cryptographic key storage and signature platform 210 identifies that the number of encrypted SEK download requests does not meet or exceed the quorum threshold, the cryptographic key storage and signature platform 210 may continue to received additional encrypted SEK download requests until the quorum threshold is met or exceeded. In some instances, the cryptographic key storage and signature platform 210 might not compare the number of received encrypted SEK download requests to the quorum threshold, and may instead simply proceed to step 316.

Figure 3D:
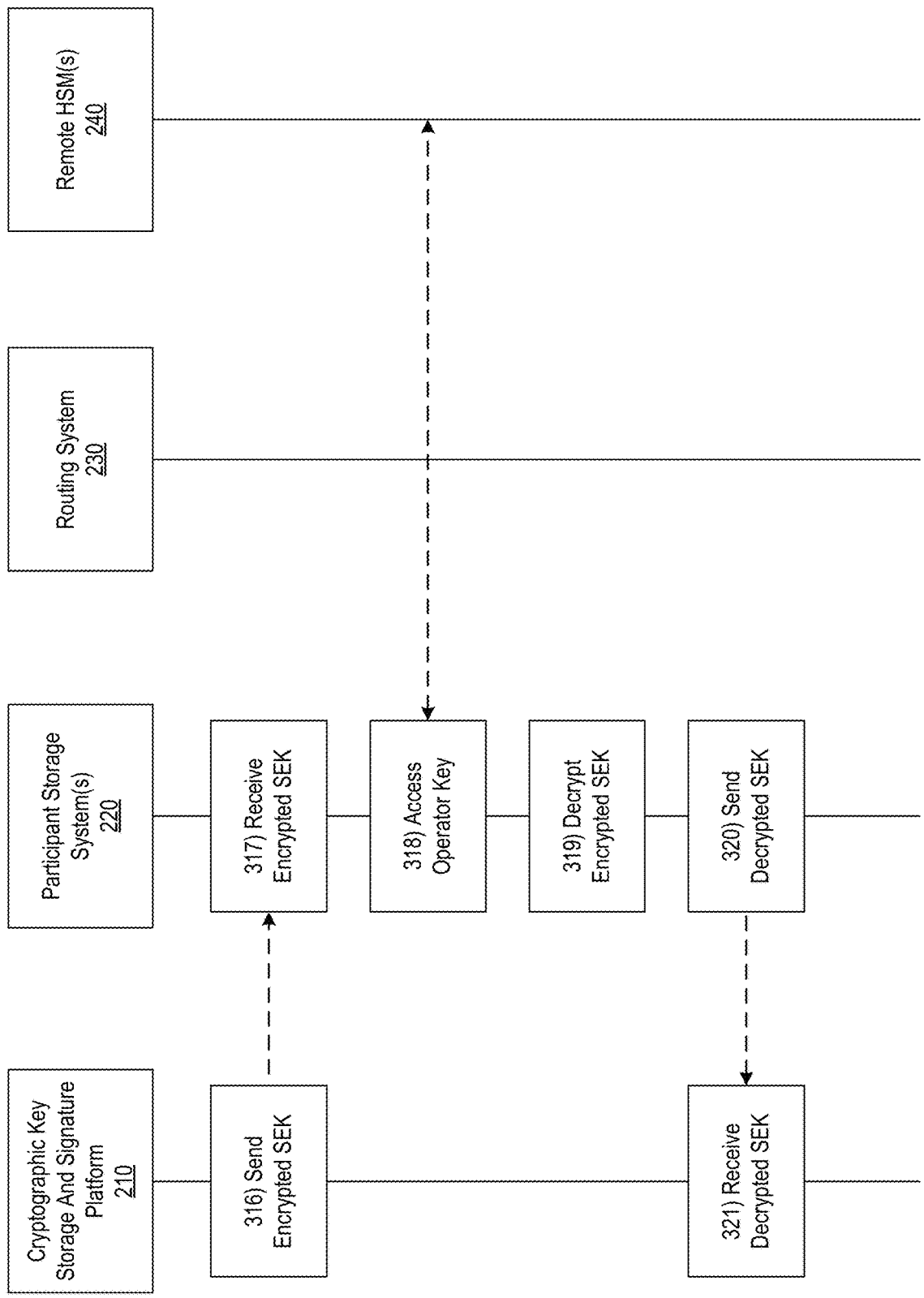

Referring to FIG. 3D, at step 316, based on identifying that the number of encrypted SEK download requests meets or exceeds the quorum threshold at step 315, the cryptographic key storage and signature platform 210 may send encrypted SEKs corresponding to the SEK download requests, to each respective participant storage system(s) 220 of the first subset. In doing so, the cryptographic key storage and signature platform 210 may facilitate SEK decryption (e.g., because the participant storage system(s) 220 may be configured to decrypt the respective encrypted SEKs), which may enable downstream access. In some instances, the cryptographic key storage and signature platform 210 might not wait to receive a number of encrypted SEK download requests prior to sending the encrypted SEKs. In some instances, the cryptographic key storage and signature platform 210 may identify participant storage system(s) 220 corresponding to each respective encrypted SEK to be sent (e.g., based on the operator/participant identifier stored along with each respective encrypted SEK), and send the encrypted SEKs accordingly. This is illustrated, for example, in diagram 800 of FIG. 8. In some instances, the cryptographic key storage and signature platform 210 may send the encrypted SEKs using the secure information enclave 210*b*. Alternatively, the encrypted SEKs may be sent by an administrator API, the shard storage database 210*a*, and/or other devices/systems. In some instances, the cryptographic key storage and signature platform 210 may send the encrypted SEKs over a secure connection (e.g., a secure sockets layer (SSL), encrypted connection, transport layer security (TLS) encrypted connection, via a bastion server, and/or other secure connection) or an unsecure connection, either of which may be wired or wireless.

In some instances, in sending the encrypted SEKs, the cryptographic key storage and signature platform 210 may send the encrypted SEKs to participants/operators corresponding to the target sensitive information (e.g., associated with the same entity, authorized to facilitate target sensitive information access, and/or otherwise affiliated). In some instances, in sending the encrypted SEKs, the cryptographic key storage and signature platform 210 may send an encrypted SEK, to each respective operator/participant of the first subset, that is associated with the respective operator/participant (e.g., the participant storage system(s) 220 for a respective operator/participant that holds the operator key configured to decrypt the corresponding encrypted SEK). In other instances, in sending the encrypted SEKs, the cryptographic key storage and signature platform 210 may send all encrypted SEKs from the set to all operators/participants, and the operators/participants themselves may identify which encrypted SEKs are relevant to them. In some instances, in sending the encrypted SEKs, the cryptographic key storage and signature platform 210 may send the encrypted SEKs to a number of operators greater than or equal to the quorum threshold.

In some instances, in sending the encrypted SEKs, the cryptographic key storage and signature platform 210 may send encrypted SEKs from a single share set (and/or encrypted SEK set) or different share sets. In some instances, the cryptographic key storage and signature platform 210 may select a share set (from which to select encrypted SEKs to send) associated with the target sensitive information (e.g., associated with the access event). For example, a target CSK may be mapped to remote HSM 240, which may be mapped to one or more share sets storing the encrypted SEKs and the respective encrypted shares of a master secret for generating a password for the remote HSM 240 (e.g., the target sensitive information).

Although step 316 illustrates sending the encrypted SEKs to the participant storage system(s) 220, this is for illustrative purposes, and the encrypted SEKs may be sent to other devices corresponding to the various operators/participants of the first subset (e.g., smartphones, laptops, desktops, and/or other devices) without departing from the scope of the disclosure. Furthermore, although step 316 is depicted as a response to receiving encrypted SEK download requests, in some instances, the cryptographic key storage and signature platform 210 may send the encrypted SEKs after the encrypted SEKs are generated (e.g., in which case the participant storage system(s) 220 may store the encrypted SEKs, optionally in association with the target sensitive information's identifier), when an access event is detected, when an authorized participant/operator requests their respective encrypted SEK, and/or at another time without departing from the scope of the disclosure.

At step 317, the participant storage system(s) 220 may receive or otherwise retrieve their respective encrypted SEKs (e.g., as sent at step 316). In other instances, the participant storage system(s) 220 may retrieve their encrypted SEKs from the shard storage database 210*a* (e.g., after participant/operator authentication, in response to receipt of a participant/operator notification, or the like). For example, the participant storage system(s) 220 may retrieve their respective encrypted SEK(s) using: their operator key (which may, e.g., be a key pair that include both an SEK encryption key and a corresponding SEK decryption key), using a participant identifier, using an encrypted SEK identifier (e.g., sent to the participant storage system(s) 220), and/or other information.

At step 318, the participant storage system(s) 220 may access its corresponding operator keys from the remote HSM(s) 240 (e.g., while a wired or wireless data connection is established with the remote HSM(s) 240). In some instances, the participant storage system(s) 220 may use a master secret to derive a password that may be used to access the remote HSM(s) 240 storing the corresponding operator keys (e.g., a remote HSM password), and may, in some instances, decrypt an encrypted form of the operator key (as is illustrated in FIG. 2B). In these instances, the master secret may be used to derive sensitive information (e.g., a password, an encryption key, a cryptocurrency private key), may be sensitive information (e.g., a password), may be used to decrypt sensitive information, and/or otherwise be used to access the remote HSM(s) 240. In some instances, the master secret may be periodically rotated or be static. In some instances, the master secret may be nonexportable (e.g., in cleartext). In some instances, the master secret may be sharded into a plurality of shares that may each be encrypted with a corresponding SEK stored in the shard storage database 210*a*.

At step 319, after obtaining their respective operator keys, the participant storage system(s) 220 may use the operator keys to decrypt their respective encrypted SEKs. For example, the participant storage system(s) 220 may restore the encrypted SEKs to cleartext SEKs. Although step 319 is depicted as being performed by the participant storage system(s) 220, it may be performed by other systems without departing from the scope of the disclosure.

In some instances, the participant storage system(s) 220 may use an operator key pair to decrypt the respective encrypted SEKs. For example, the participant storage system(s) 220 may decrypt the respective encrypted SEKs using a private key (e.g., an elliptic curve private key) paired with a public SEK encryption key, a symmetric key, and/or otherwise. In some instances, the participant storage system(s) 220 may decrypt the respective SEKs using ECIES.

At step 320, the participant storage system(s) 220 may send or otherwise upload their respective decrypted SEKs back to the cryptographic key storage and signature platform 210. In some instances, the participant storage system(s) 220 may send the respective decrypted SEKs back to the shard storage database 210*a* and/or the secure information enclave 210b (e.g., uploaded to the secure information enclave 210b as shown in diagram 800 of FIG. 8). Alternatively, the participant storage system(s) 220 might not send the decrypted SEKs to the cryptographic key storage and signature platform 210, and may instead use their decrypted SEKs to decrypt their corresponding encrypted shares within the participant storage system(s) 220.

At step 321, the cryptographic key storage and signature platform 210 may receive the decrypted SEKs sent at step 320. For example, the cryptographic key storage and signature platform 210 may receive the decrypted SEKs from the participant storage system(s) 220 while a wired or wireless data connection is established. In some instances, in receiving the decrypted SEKs, the cryptographic key storage and signature platform 210 may receive the decrypted SEKs from a second subset of the participant storage systems(s) 220, which may, e.g., be the same as or include fewer participant storage system(s) 220 than the first subset of the participant storage system(s) 220 (e.g., because not all participant storage system(s) 220 may respond with a decrypted SEK).

Referring to FIG. 3E, at step 322, in some instances, the cryptographic key storage and signature platform 210 may compare a number of decrypted SEKs, received at step 321, to the quorum threshold. If the cryptographic key storage and signature platform 210 identifies that the number of decrypted SEKs meets or exceeds the quorum threshold value, the cryptographic key storage and signature platform 210 may proceed to step 323. If instead the cryptographic key storage and signature platform 210 identifies that the number of decrypted SEK is less than the quorum threshold, the cryptographic key storage and signature platform 210 may continue to wait and receive additional decrypted SEKs until the quorum threshold value is met or exceeded. In these instances, the waiting period may be time limited, and the cryptographic key storage and signature platform 210 may determine that the quorum threshold value was not achieved after expiration of a particular timeframe (in which case, the event sequence may end, and the requested transaction might not be authorized). In some instances, the cryptographic key storage and signature platform 210 may perform the comparison using the secure information enclave 210b. In other instances, the comparison may be performed by a different system/device (e.g., a participant/operator device, a third party device, and/or other devices). In some instances, the cryptographic key storage and signature platform 210 might not compare a number of decrypted SEKs to the quorum threshold value, and may instead simply proceed to step 323.

At step 323, based on or in response to identifying that the number of decrypted SEKs meets or exceeds the quorum threshold value, the cryptographic key storage and signature platform 210 may decrypt each of the encrypted shares using their corresponding decrypted SEK. In doing so, the cryptographic key storage and signature platform 210 may restore the cleartext shares that may be used to reconstruct the sensitive information. In some instances, the cryptographic key storage and signature platform 210 may perform the encrypted share decryption using the secure information enclave 210b (e.g., to prevent operator access to the shares, the encrypted shares may be sent from the secure information enclave from the share storage database 210a). In other instances, the participant storage system(s) 220 may perform the share decryption (e.g., the participation storage system(s) holding the various operator keys may decrypt the corresponding SEKs, and use the decrypted SEKs to decrypt the encrypted shares).

Figure 8:
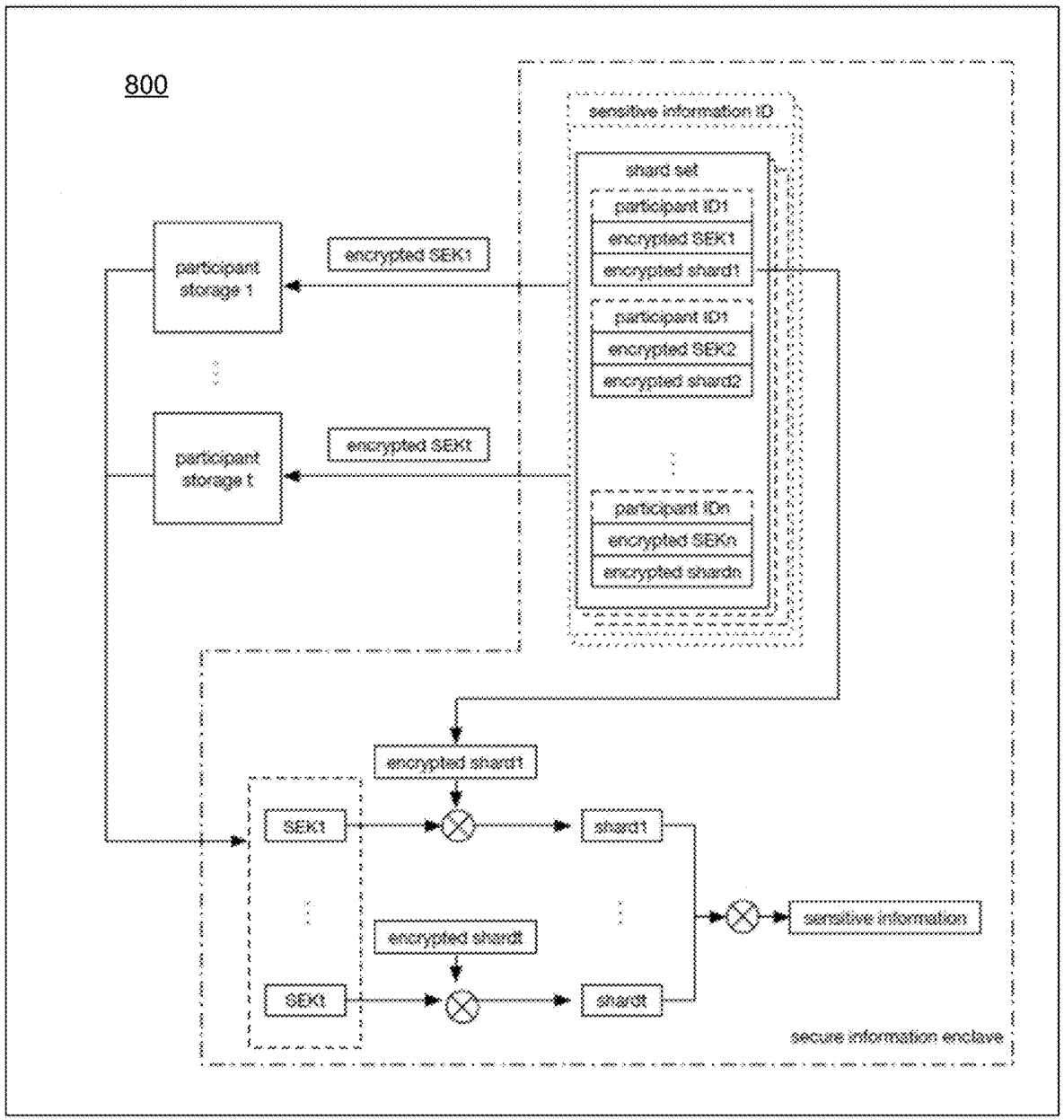

At step 324, the cryptographic key storage and signature platform 210 may reconstruct the sensitive information so as to access the sensitive information (e.g., as shown in FIG. 8). In some instances, the cryptographic key storage and signature platform 210 may reconstruct the sensitive information using the secure information enclave 210b. In other instances, the sensitive information may be reconstructed by the remote HSM(s) 240 and/or other systems. In some instances, the cryptographic key storage and signature platform 210 may identify whether a number of decrypted shares meets or exceeds the quorum threshold value. If the cryptographic key storage and signature platform 210 identifies that the number of decrypted shares does not meet or exceed the quorum threshold value, the cryptographic key storage and signature platform 210 may continue to wait until a number of shares have been decrypted that does meet or exceed the quorum threshold value. Otherwise, if the cryptographic key storage and signature platform 210 identifies that the number of decrypted shares does meet or exceed the quorum threshold value, the cryptographic key storage and signature platform 210 may reconstruct the sensitive information using a reconstruction algorithm (which may, in some instances, be paired with a sharding algorithm, such as the sharding algorithm described above in regard to the process of storing the sensitive information). For example, in some instances, the cryptographic key storage and signature platform 210 may reconstruct the sensitive information using Shamir reconstruction.

In some instances, after reconstructing the sensitive information, the cryptographic key storage and signature platform 210 may burn the corresponding share set (e.g., after an attempt to use the share set, after decrypted the encrypted shares, after reconstructing the sensitive information, when less than the threshold number of operators/participants are authorized to receive encrypted SEKs, when less than a threshold number of share sets associated with the sensitive information are left, and/or at other times). Accordingly, and as described above, it may be important to repeat the sharding process to generate a number of share sets for each given secret or piece of sensitive information.

In some instances, one or more instances of this information recovery process described above with regard to steps 310-324 may be performed for each access event (e.g., to obtain different pieces of sensitive information, using the same or different sets of operators, and/or otherwise). In some instances, the information recovery process may be performed and/or otherwise orchestrated by the secure information enclave 210b, a signing service, a remote system, a local system (e.g., a participant/operator device, participant storage system(s) 220, or other systems), and/or by another component.

At step 325, the cryptographic key storage and signature platform 210 may validate the reconstructed sensitive information. For example, the cryptographic key storage and signature platform 210 may compare the reconstructed sensitive information to one or more stored parameters and/or otherwise authenticate the reconstructed sensitive information. If the cryptographic key storage and signature platform 210 determines that the reconstructed sensitive information is valid, it may proceed to step 326. Otherwise, if the cryptographic key storage and signature platform 210 determines that the reconstructed sensitive information is not valid, the event sequence may end, and the requested transaction might not be authorized.

Referring to FIG. 3F, at step 326, the cryptographic key storage and signature platform 210 may use the sensitive information (which may, e.g., be a CSK) to sign one or more blockchain messages corresponding to the transaction request. In doing so, the cryptographic key storage and signature platform 210 may authorize the requested transaction, which may, in some instances, cause the requested amount of cryptocurrency to be transferred from the first account to the second account.

In some instances, the cryptographic key storage and signature platform 210 may use a curve-based signer, which may operate on curves and keys, and may have limited (or no) knowledge of cryptocurrencies. This may reduce surface area, and separate concerns for the cryptographic key storage and signature platform 210, which may then be able to primarily focus on security of secure information, keys, and/or other information. In these instances, the cryptographic key storage and signature platform 210 may rely on a separate orchestration system (e.g., that receives a signing request and orchestrates unsigned message signing by the correct curve/key) to perform any useful cryptocurrency work. In some instances, this additional system may be online, multi-party compute, centralized, and/or otherwise constructed.

In some instances, based on the increased security mechanisms and storage methods described above, balance limits for the first and/or second accounts may be increased. For example, the maximum balances permitted for the first and/or second accounts (which may, e.g., be cryptocurrency hot wallets) may be equal to or greater than the maximum balance permitted in a third account (which may, e.g., be an offline cryptocurrency wallet).

Figure 9:
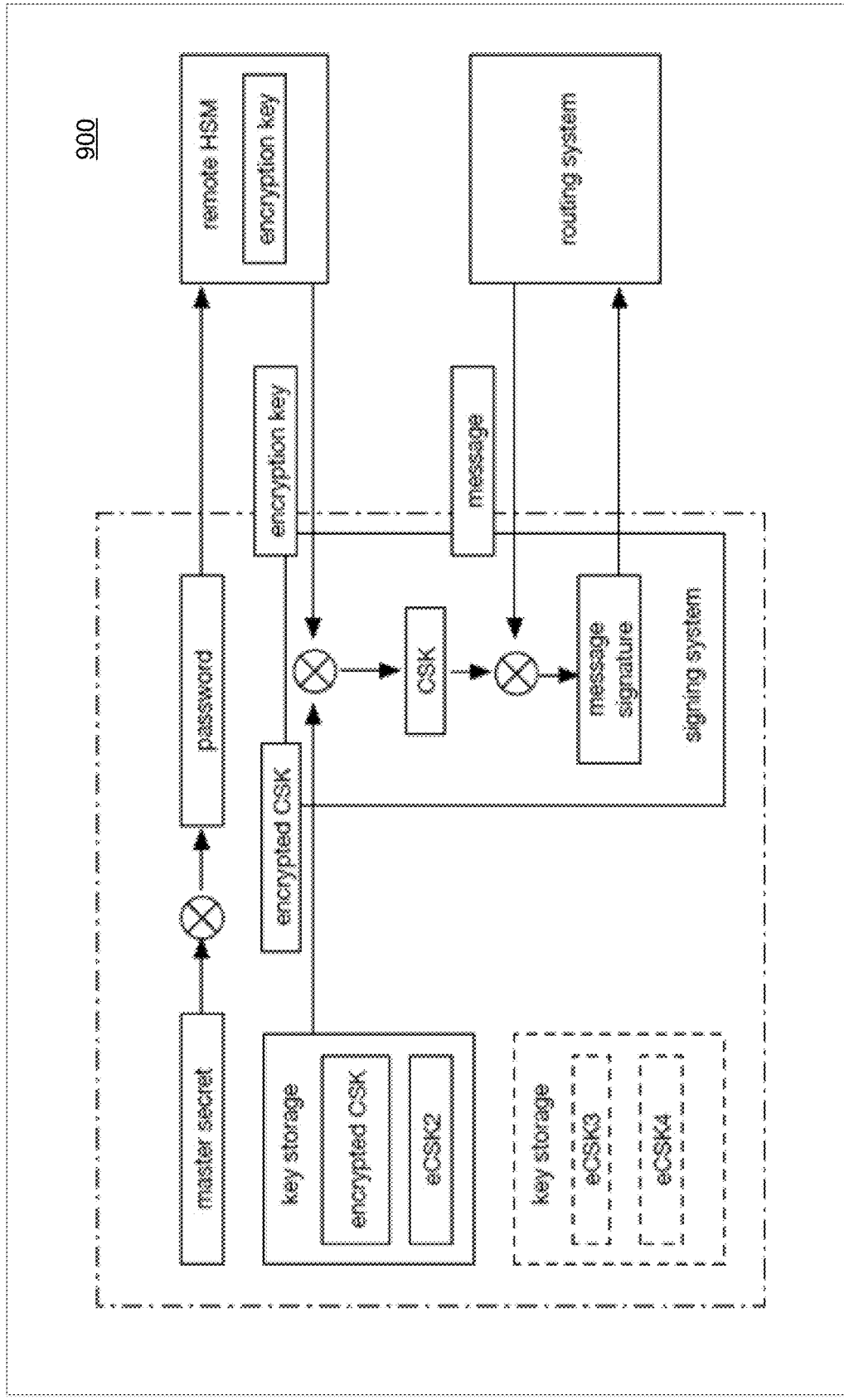

Although step 326 refers to the sensitive information as a CSK, this is for illustrative purposes only, and the sensitive information may comprise other information without departing from the scope of the disclosure. For example, the sensitive information may be a master secret, which may be used to derive a password or otherwise used (e.g., as shown in diagram 900 of FIG. 9). In these instances, the password may be used to access and/or decrypt a remote HSM (such as remote HSM(s) 240) (e.g., via an end-to-end encryption connection) storing an encryption key that may be used to access and/or decrypt encrypted CSKs stored in a key storage (e.g., key storage 210c). In these instances, the encrypted CSKs may be decrypted in situ (e.g., in the key storage 210c), be transferred to the secure information enclave (e.g., the signing system) and decrypted in the secure information enclave 210b, and/or decrypted in any other computing environment. In these instances, the decrypted CSKs may then be used to sign one or more blockchain messages received by the secure information enclave 210b (e.g., and thus authorize the requested transaction).

In yet another example, the sensitive information may be used to establish a persistent connection between two or more components (e.g., remote HSM(s) 240 and the secure information enclave 210b; the remote HSM(s) 240, the secure information enclave 210b, and the key storage 210c; and/or other component combinations).

In some examples, multiple instances and/or multi-node configurations of the above described systems may be configured and implemented without departing from the scope of the disclosure. In these instances, bootstrapping sets for remote HSM(s) 240, operator devices, and/or other systems may be automated, which may remove any need to rely on trusted, offline ceremonies for setup.

In some instances, the systems may be designed to work without offline ceremonies. For example, to scale to multiple instances (and later, multi-node configurations) new instances may be bootstrapped. In some instances, rather than using trusted offline ceremonies, automation may be used for bootstrapping new instances, remote HSM(s) 240, and/or operator sets, and operations may be able to bootstrap their corresponding remote HSM(s) 240.

In addition or as an alternative to the methods described above, the cryptographic key storage and signature platform 210 may use cloud HSM to encrypt cryptocurrency private keys. In these instances, the cryptographic key storage and signature platform 210 may generate a non-exportable AES key, and may encrypt cryptocurrency private keys using AES-GCM (and possibly native secp256k1). In these instances, it may be difficult for an attacker to obtain cryptocurrency private keys outside of a cloud account affiliated with the corresponding keys.

Such cloud HSM instances may be internet protocol (IP) addresses, and the cryptographic key storage and signature platform 210 may cryptographically assert that they are communicating with a cloud HSM instance that was previously provisioned. Additionally, the cryptographic key storage and signature platform 210 may be able to establish an end-to-end encrypted connection to the cloud HSM (e.g., by loading a pkcs11 shared-library). This shared library may then use the connection to transmit a password to the cloud HSM instances. These cloud HSM instances might not be able to do anything, or even read the keys that it stores, without this password.

Operators may interact with the cryptographic key storage and signature platform 210 (e.g., via the participant storage system(s) 220 and using an operator tool). This operator tool may communicate with the cryptographic key storage and signature platform 210 (and the corresponding remote HSM(s) 240 instance) through an administrator API. Authentication to this administrator API may implement a HSM (e.g., remote HSM 240), and/or otherwise (e.g., the operators may post secrets).

In these instances, the administrator APIs may be implemented in gRPC, and the administrator service may provide a simplified and limited set of remote HSM(s) 240 features for system operators to interact with. Authentication and authorization to this API may be restricted using mTLS (or, in some instances, delta keys), with private keys used to authenticate the system operators stored on HSMs, secure devices, or otherwise, and private keys to authenticate the system services stored on remote HSM(s) 240 instances. In these instances, the keys for TLS (or delta keys) may be stored in a separate account on the cloud HSM instances, and the password for this account may be stored in codeflow or elsewhere in the environment.

In some instances, this administrator endpoint may be used to post secrets that may be used to derive a password for remote HSM(s) 240. Additionally or alternatively, the administrator endpoint may reset passwords for various accounts. These endpoints may be implemented using cloud HSM quorum authentication. The orchestration of resetting passwords via these mechanisms may ensure that passwords are not accidentally lost to remote HSM(s) 240. In some instances, the system may implement TLS tunneling, SSH bastions, and/or other security systems/mechanisms.

In some instances, instances of the cryptographic key storage and signature platform 210, the shard storage database 210a, and/or the secure information enclave 210b may read a master key automatically at startup, which may, e.g., be encrypted (e.g., key management service (KMS), remote HSM(s) 240, and/or otherwise). In these instances, the cryptographic key storage and signature platform 210 may have access to corresponding decryption keys.

Additionally or alternatively, instances of the cryptographic key storage and signature platform 210, the shard storage database 210a, and/or the secure information enclave 210b might not possess the master key (which may, e.g., be used to decrypt the shard storage database 210a). In these instances, master secrets may be posted to the cryptographic key storage and signature platform 210 after a quorum of operators approve the deployment.

In some instances, during, in addition, or as an alternative to the methods described above, one or more secrets, passwords, keys, or other information may be rotated as described below. A main cryptocurrency encryption key (which may e.g., be an advanced encryption standard (AES) key) may be non-exportable and protected by a password. This main cryptocurrency encryption key might not be rotated. Instead, the password of the corresponding account may be changed, or all keys may be decrypted and re-encrypted.

The password may exist in memory of the cryptographic key storage and signature platform 210, and may, in some instances, be derived from the master secret/sensitive information. This password may be rotated based on a quorum of the operators calling a system administrator endpoint and requesting rotation. In these instances, the password may be rotated in tandem with the master secret or sensitive information, which may, e.g., be on a fixed schedule (e.g., quarterly), when a share is lost, when changes are made to the operator set, and/or otherwise.

The system master secret/sensitive information may exist in memory of the cryptographic key storage and signature platform 210, and may be rotated in tandem with the password as described above.

The remote HSM(s) 240 passwords may be secured by the corresponding operator's password manager, and the operators may change these passwords as necessary (e.g., if the remote HSM 240 is passed to a replacement operator or otherwise).

The operator key (e.g., an operator's master secret decryption key/mTLS key) may be stored at the remote HSM(s) 240 and may be non-exportable. Operators may generate new keys (e.g., at a predetermined frequency) and register the new keys in a shared operator repository.

An operator's password may be changed by the corresponding operator, who may call a system administrator API to make the change (e.g., if the HSM is passed to a replacement operator, on a yearly basis, or the like).

An operator's cloud HSM key may be imported into the operator's HSM (e.g., remote HSM(s) 240) or generated within the HSM (e.g., remote HSM(s) 240), may be changed by the corresponding operator, who may call a system administrator API to make the change (e.g., if the HSM 240 is passed to a replacement operator, on a yearly basis, or the like).

A server TLS key may be non-exportable and stored using a bootstrap remote HSM crypto user account. This key may be changed based on a call from a corresponding operator to the system administrator API. A bootstrap remote HSM account password may be changed based on a call from a corresponding operator to the system administrator API.

Accordingly, by performing one or more of the methods described above, several technical benefits may be achieved. For example, given the increased security features, hot wallet insurance limits may be increased. In addition, master secret management, security, protection against malicious insiders, and/or secret rotation may be improved. Similarly, disaster recovery may be improved (e.g., as keys may be stored for disaster recovery prior to being assigned to consumers). APIs may be simplified and surface area may be reduced (e.g., because the system may operate on curves and keys and might have as little knowledge of cryptocurrencies as possible, which may allow the system to focus on key security). In addition, stronger ownership of keys may be achieved, ensuring that only the owner of a key is allowed to sign with it. Additionally because there may be several intermediaries involved in the key storage/hot wallet processes, there may be strong guarantees that keys/addresses have not been tampered with.

Figure 4:
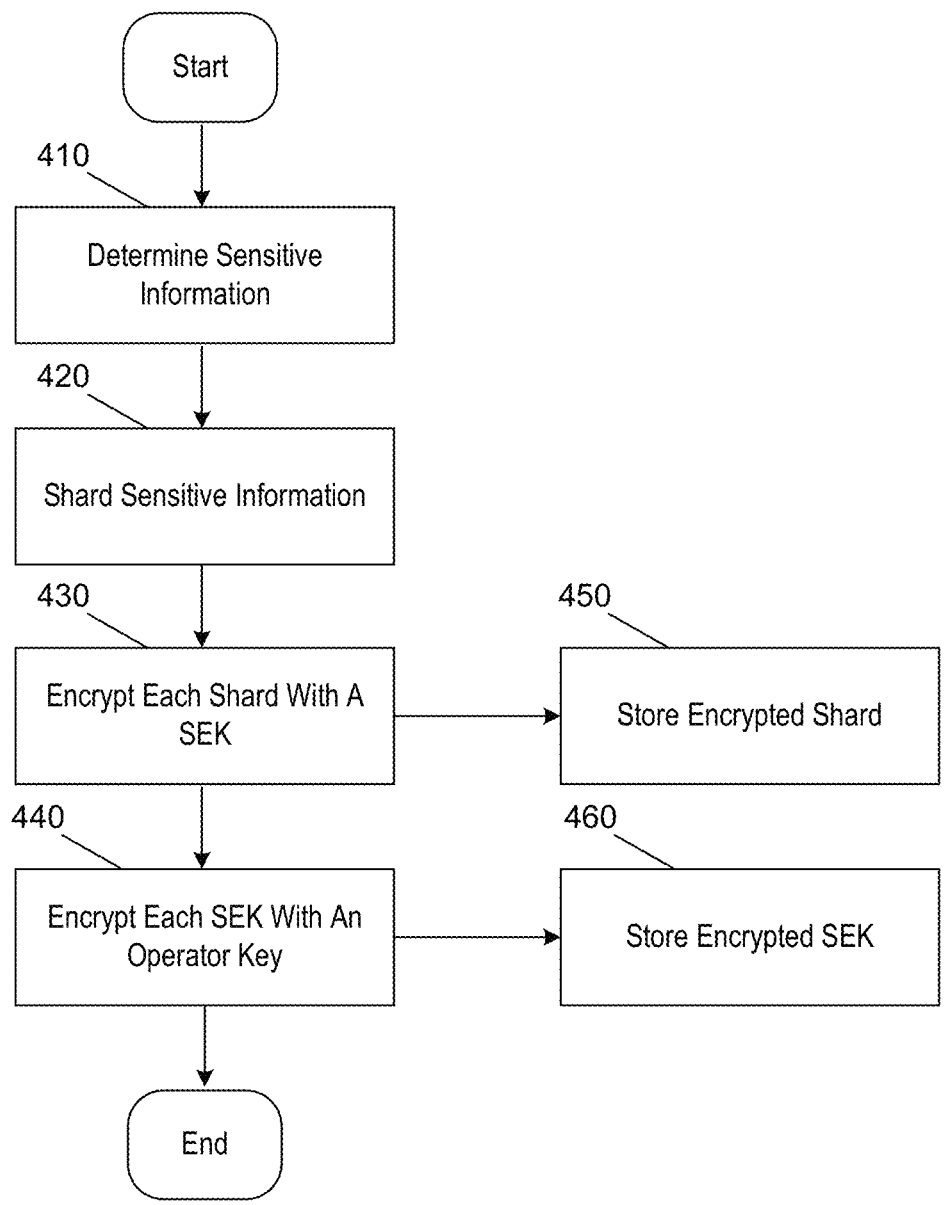
FIGS. 4-6 depict illustrative methods for performing cryptographic key storage to enhance security in cryptocurrency storage and hot wallet transactions in accordance with one or more example embodiments.

FIG. 4 depicts an illustrative method for performing cryptographic key storage to enhance security in cryptocurrency storage and hot wallet transactions in accordance with one or more example embodiments. For example, FIG. 4 depicts a summary flowchart indicating the actions performed by cryptographic key storage and signature platform 210 in storing sensitive information, which is further illustrated and described above with regard to steps 301-309 and FIGS. 3A-3B. Referring to FIG. 4, at step 410, a computing platform having at least one processor, a communication interface, and memory may determine sensitive information (as described in greater detail above with regard to step 301). At step 420, the computing platform may shard the sensitive information (as described in greater detail above with regard to step 301). At step 430, the computing platform may encrypt each shard with a SEK (as described in greater detail above with regard to steps 302-303). At step 440, the computing platform may encrypt each SEK with an operator key (e.g., an SEK encryption key) (as described in greater detail above with regard to steps 304-305). At step 450, the computing platform may store the encrypted shard (as described in greater detail above with regard to step 309). At step 460, the computing platform may store the encrypted SEK (as described in greater detail above with regard to step 309).

Figure 5:
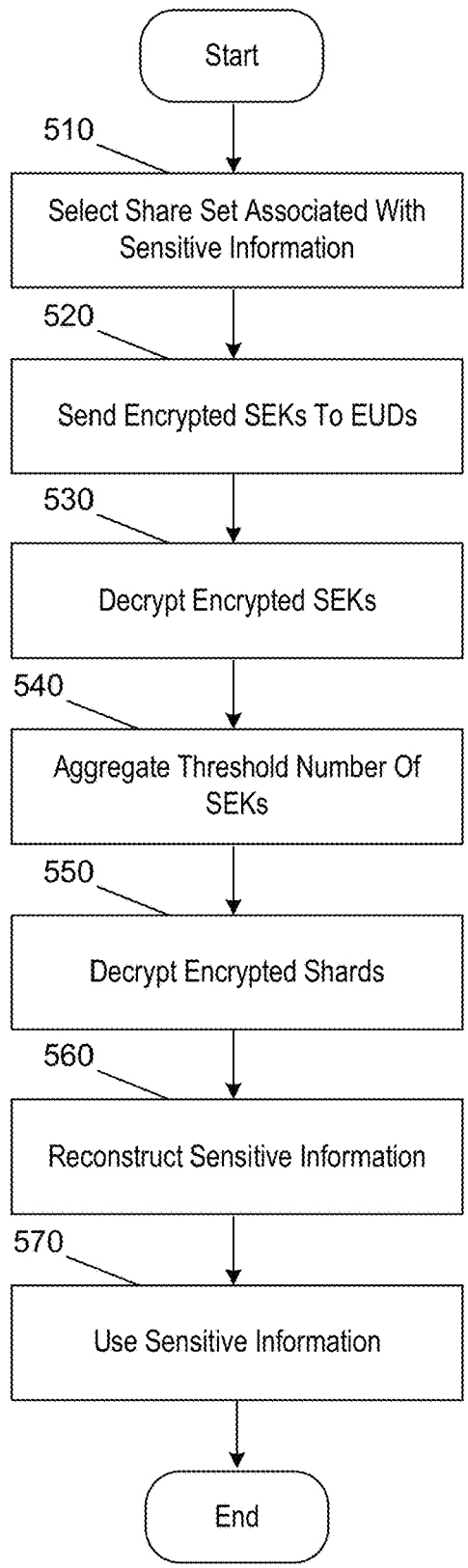

FIG. 5 depicts an illustrative method for performing cryptographic key storage to enhance security in cryptocurrency storage and transactions in accordance with one or more example embodiments. For example, FIG. 5 depicts a summary flowchart indicating the actions performed by cryptographic key storage and signature platform 210 in reconstructing the sensitive information stored using the method described in FIG. 4. This method is further illustrated and described above with regard to steps 310-326 and FIGS. 3C-3F. Referring to FIG. 5, at step 510, a computing platform having at least one processor, a communication interface, and memory may select a share set associated with sensitive information (as described in greater detail above with regard to step 311). At step 520, the computing platform may send encrypted SEKs to end user devices of operators/participants (e.g., participant storage system(s) 220 as described in greater detail above with regard to step 311). At step 530, the computing platform may decrypt the encrypted SEKs (as described in greater detail above with regard to step 314-321). At step 540, the computing platform may aggregate a threshold number of SEKs (as described in greater detail above with regard to step 322). At step 550, the computing platform may decrypt the encrypted shards using the decrypted SEKs (as described in greater detail above with regard to step 323). At step 560, the computing platform may reconstruct the sensitive information using the decrypted shards (as described in greater detail above with regard to step 324). At step 570, the computing platform may use the sensitive information (as described in greater detail above with regard to step 326).

Figure 6:
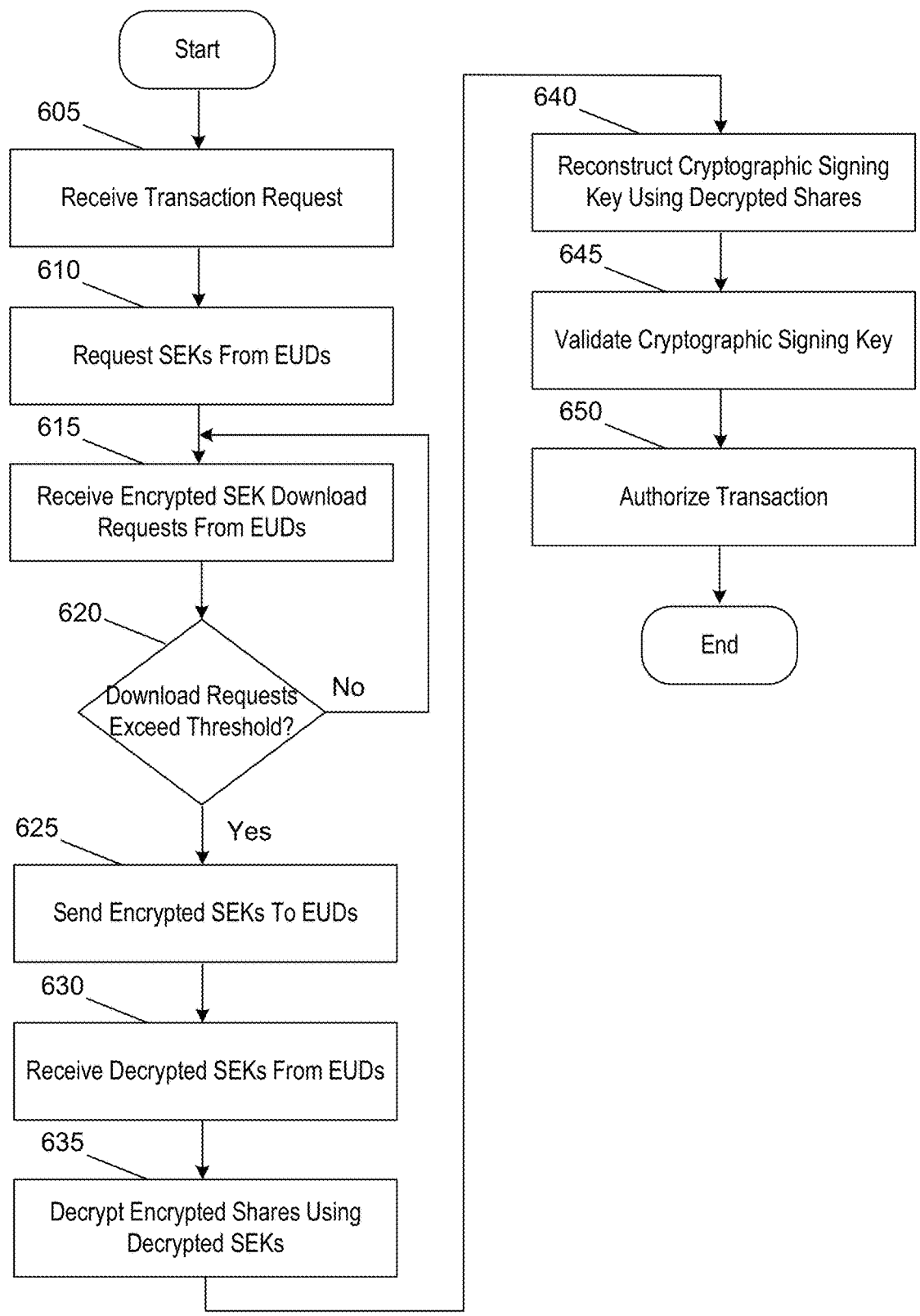

FIG. 6 depicts an illustrative method for authorizing cryptocurrency hot wallet transactions using a stored cryptographic key in accordance with one or more example embodiments. For example, FIG. 6 depicts a summary flowchart indicating the actions performed by cryptographic key storage and signature platform 210 in authorizing cryptocurrency hot wallet transactions, which is further illustrated and described above with regard to steps 310-326 and FIGS. 3C-3F. Referring to FIG. 6, at step 605, a computing platform having at least one processor, a communication interface, and memory may receive a cryptocurrency transaction request (as described in greater detail above with regard to step 310). At step 610, the computing platform may request SEKs from end user devices/participant storage system(s) (as described in greater detail above with regard to step 311). At step 615, the computing platform may receive encrypted SEK download requests from the end user devices/participant storage system(s) (as described in greater detail above with regard to step 314). At step 620, the computing platform may identify whether or not the number of download requests received meets or exceeds a quorum threshold (as described in greater detail above with regard to step 315). If the number of download requests does not meet or exceed a quorum threshold, the computing platform may return to step 615. Otherwise, if the number of download requests does meet or exceed a quorum threshold, the computing platform may proceed to step 625.

At step 625, the computing platform may send encrypted SEKs to the end user devices/participant storage system(s) for decryption (as described in greater detail above with regard to step 316). At step 630, the computing platform may receive decrypted SEKs from the end user devices/participant storage system(s) (as described in greater detail above with regard to step 321). At step 635, the computing platform may decrypt encrypted shares using their corresponding decrypted SEKs (as described in greater detail above with regard to step 323). At step 640, the computing platform may reconstruct a cryptographic signing key (or other sensitive information) using the decrypted shares (as described in greater detail above with regard to step 324). At step 645, the computing platform may validate the cryptographic signing key (as described in greater detail above with regard to step 325). At step 650, the computing platform may authorize the requested cryptocurrency transaction using the cryptographic signing key (as described in greater detail above with regard to step 326).

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method comprising:

splitting, by a computing platform comprising at least one processor, a communication interface, and memory, a cryptographic signature key into a plurality of cryptographic key shares, wherein the cryptographic signature key may be derived using a quorum number of the plurality of cryptographic key shares;

generating a plurality of encrypted cryptographic key shares and a plurality of share encryption keys (SEKs) by, for each respective cryptographic key share of the plurality of cryptographic key shares:

generating a corresponding SEK for the respective cryptographic key share; and encrypting, using the corresponding SEK, the respective cryptographic key share to create a corresponding encrypted cryptographic key share;

generating a plurality of encrypted SEKs and a plurality of operator keys by, for each respective SEK of the plurality of SEKs:
    generating a corresponding operator key for the respective SEK; and
    encrypting, using the corresponding operator key, the respective SEK to create a corresponding encrypted SEK;
distributing the plurality of operator keys corresponding to the plurality of encrypted SEKs to a plurality of end user devices (EUDs) by, for each EUD of the plurality of EUDs:
    providing a corresponding operator key to a hardware security module (HSM) of the respective EUD, wherein the HSM is configured to prevent unauthorized copying of the corresponding operator key;
storing, by the computing platform, the plurality of encrypted cryptographic key shares, the plurality of encrypted SEKs, and indications identifying, for each respective encrypted SEK of the plurality of encrypted SEKS, the respective EUD storing the corresponding operator key;
receiving, from a first subset of EUDs, requests to download an encrypted SEK corresponding to each respective EUD of the first subset of EUDs, wherein the first subset of EUDs comprises at least the quorum number of EUDs;
sending, to each EUD of the first subset, a respective encrypted SEK of the plurality of encrypted SEKs;
receiving, from each EUD of a second subset of EUDs, a corresponding decrypted SEK decrypted by a respective EUD using the operator key stored in an HSM of the respective EUD;
decrypting, using the decrypted SEKs received from the second subset of EUDs and based on determining that the second subset of EUDs comprises at least the quorum number of EUDs, corresponding encrypted cryptographic key shares; and
reconstructing, using a reconstruction algorithm and the quorum number of the plurality of decrypted cryptographic key shares, the cryptographic signature key.

2. The method of claim 1, wherein splitting the cryptographic signature key into the plurality of cryptographic key shares comprises splitting the cryptographic signature key one or more times, wherein each respective split of the cryptographic signature key results in a corresponding plurality of cryptographic key shares.

3. The method of claim 2, wherein the plurality of cryptographic key shares comprises a set of single use share sets.

4. The method of claim 1, further comprising:
destroying, after reconstructing the cryptographic signature key, the plurality of cryptographic key shares and their corresponding SEKs.

5. The method of claim 1, further comprising:
receiving a transaction request, wherein the cryptographic signature key is configured to authorize the requested transaction; and
requesting the plurality of SEKs, wherein requesting the plurality of SEKs is responsive to receiving the transaction request.

6. The method of claim 5, further comprising:
validating the cryptographic signature key; and
based on successful validation of the cryptographic signature key, authorizing the requested transaction.

7. The method of claim 1, wherein splitting the cryptographic signature key into the plurality of cryptographic key shares comprises executing one or more of: a Shamir's secret sharing algorithm, a Blakely's scheme, or a Chinese remainder algorithm.

8. The method of claim 1, further comprising:
removing an EUD from the plurality of EUDs;
identifying whether a remaining number of EUDs in the plurality of EUDs is greater than or equal to the quorum number;
based on identifying that the remaining number of EUDs is greater than or equal to the quorum number, delete, for the removed EUD, a corresponding SEK and a corresponding cryptographic key share;
based on identifying that the remaining number of EUDs is less than the quorum number:
    add a new EUD to the plurality of EUDs;
    re-assign an operator key, previously associated with the removed EUD, to the new EUD, wherein re-assigning the respective operator key comprises:
        transferring the respective operator key to a respective HSM for the new EUD; and
        updating an indication, for an encrypted SEK corresponding to the respective operator key and identifying the removed EUD, to identify the new EUD.

9. A system comprising:
at least one processor;
a communication interface communicatively coupled to the at least one processor; and
memory storing computer-readable instructions that, when executed by the at least one processor, cause the system to:
    split, a cryptographic signature key into a plurality of cryptographic key shares, wherein the cryptographic signature key may be derived using a quorum number of the plurality of cryptographic key shares;
    generate a plurality of encrypted cryptographic key shares and a plurality of share encryption keys (SEKs) by, for each respective cryptographic key share of the plurality of cryptographic key shares:
        generate a SEK for the respective cryptographic key share; and
        encrypt, using the corresponding SEK, the respective cryptographic key share to create a corresponding encrypted cryptographic key share;
    generate a plurality of encrypted SEKs and a plurality of operator keys by, for each respective SEK of the plurality of SEKs:
        generate a corresponding operator key for the respective SEK; and
        encrypt, using the corresponding operator key, the respective SEK to create a corresponding encrypted SEK;
    distribute the plurality of operator keys corresponding to the plurality of encrypted SEKs to a plurality of end user devices (EUDs) by, for each EUD of the plurality of EUDs:
        provide a corresponding operator key to a hardware security module (HSM) of the respective EUD, wherein the HSM is configured to prevent unauthorized copying of the corresponding operator key;
    store, by the computing platform, the plurality of encrypted cryptographic key shares, the plurality of encrypted SEKs, and indications identifying, for each respective encrypted SEK of the plurality of encrypted SEKS, the respective EUD storing the corresponding operator key;

receive, from a first subset of EUDs, requests to download an encrypted SEK corresponding to each respective EUD of the first subset of EUDs, wherein the first subset of EUDs comprises at least the quorum number of EUDs;

send, to each EUD of the first subset, a respective encrypted SEK of the plurality of encrypted SEKs;

receive, from each EUD of a second subset of EUDs, a corresponding decrypted SEK decrypted by a respective EUD using the operator key stored in an HSM of the respective EUD;

decrypt, using the decrypted SEKs received from the second subset of EUDs and based on determining that the second subset of EUDs comprises at least the quorum number of EUDs, corresponding encrypted cryptographic key shares; and reconstruct, using a reconstruction algorithm and the quorum number of the plurality of decrypted cryptographic key shares, the cryptographic signature key.

10. The system of claim 9, wherein splitting the cryptographic signature key into the plurality of cryptographic key shares comprises splitting the cryptographic signature key one or more times, wherein each respective split of the cryptographic signature key results in a corresponding plurality of cryptographic key shares.

11. The system of claim 10, wherein the plurality of cryptographic key shares comprises a set of single use share sets.

12. The system of claim 9, wherein the computer-readable instructions, when executed by the at least one processor, further cause the system to:
destroy, after reconstructing the cryptographic signature key, the plurality of cryptographic key shares and their corresponding SEKs.

13. The system of claim 9, wherein the computer-readable instructions, when executed by the at least one processor, further cause the system to:
receive a transaction request, wherein the cryptographic signature key is configured to authorize the requested transaction; and
request the plurality of SEKs, wherein requesting the plurality of SEKs is responsive to receiving the transaction request.

14. The system of claim 13, wherein the computer-readable instructions, when executed by the at least one processor, further cause the system to:
validate the cryptographic signature key; and
based on successful validation of the cryptographic signature key, authorize the requested transaction.

15. The system of claim 9, wherein splitting the cryptographic signature key into the plurality of cryptographic key shares comprises executing one or more of: a Shamir's secret sharing algorithm, a Blakely's scheme, or a Chinese remainder algorithm.

16. One or more non-transitory computer-readable media storing instructions that, when executed by a computing platform comprising at least one processor, a communication interface, and memory, cause the computing platform to:
split a cryptographic signature key into a plurality of cryptographic key shares, wherein the cryptographic signature key may be derived using a quorum number of the plurality of cryptographic key shares;
generate a plurality of encrypted cryptographic key shares and a plurality of share encryption keys (SEKs) by, for each respective cryptographic key share of the plurality of cryptographic key shares:
generate a corresponding SEK for the respective cryptographic key share; and
encrypt, using the corresponding SEK, the respective cryptographic key share to create a corresponding encrypted cryptographic key share;
generate a plurality of encrypted SEKs and a plurality of operator keys by, for each respective SEK of the plurality of SEKs:
generate a corresponding operator key for the respective SEK; and
encrypt, using the corresponding operator key, the respective SEK to create a corresponding encrypted SEK;
distribute the plurality of operator keys corresponding to the plurality of encrypted SEKs to a plurality of end user devices (EUDs) by, for each EUD of the plurality of EUDs:
provide a corresponding operator key to a hardware security module (HSM) of the respective EUD, wherein the HSM is configured to prevent unauthorized copying of the corresponding operator key;
store, by the computing platform, the plurality of encrypted cryptographic key shares, the plurality of encrypted SEKs, and indications identifying, for each respective encrypted SEK of the plurality of encrypted SEKS, the respective EUD storing the corresponding operator key;
receive, from a first subset of EUDs, requests to download an encrypted SEK corresponding to each respective EUD of the first subset of EUDs, wherein the first subset of EUDs comprises at least the quorum number of EUDs;
send, to each EUD of the first subset, a respective encrypted SEK of the plurality of encrypted SEKs;
receive, from each EUD of a second subset of EUDs, a corresponding decrypted SEK decrypted by a respective EUD using the operator key stored in an HSM of the respective EUD;
decrypt, using the decrypted SEKs received from the second subset of EUDs and based on determining that the second subset of EUDs comprises at least the quorum number of EUDs, corresponding encrypted cryptographic key shares; and
reconstruct, using a reconstruction algorithm and the quorum number of the plurality of decrypted cryptographic key shares, the cryptographic signature key.

17. The one or more non-transitory computer-readable media of claim 16, wherein splitting the cryptographic signature key into the plurality of cryptographic key shares comprises splitting the cryptographic signature key one or more times, wherein each respective split of the cryptographic signature key results in a corresponding plurality of cryptographic key shares.

18. The one or more non-transitory computer-readable media of claim 17, wherein the plurality of cryptographic key shares comprises a set of single use share sets.

19. The one or more non-transitory computer-readable media of claim 16, wherein the instructions, when executed by the at least one processor, further cause the computing platform to:
destroy, after reconstructing the cryptographic signature key, the plurality of cryptographic key shares and their corresponding SEKs.

20. The one or more non-transitory computer-readable media of claim 16, wherein the instructions, when executed by the at least one processor, further cause the computing platform to:
    receive a transaction request, wherein the cryptographic signature key is configured to authorize the requested transaction; and
    request the plurality of SEKs, wherein requesting the plurality of SEKs is responsive to receiving the transaction request.

* * * * *